United States Patent
Yoshio

(10) Patent No.: US 9,047,505 B2
(45) Date of Patent: Jun. 2, 2015

(54) COLLATING DEVICE

(75) Inventor: Hiroaki Yoshio, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 307 days.

(21) Appl. No.: 13/641,761

(22) PCT Filed: Apr. 13, 2011

(86) PCT No.: PCT/JP2011/002196
§ 371 (c)(1),
(2), (4) Date: Oct. 17, 2012

(87) PCT Pub. No.: WO2011/132387
PCT Pub. Date: Oct. 27, 2011

(65) Prior Publication Data
US 2013/0039590 A1    Feb. 14, 2013

(30) Foreign Application Priority Data
Apr. 19, 2010   (JP) ................................. 2010-096009

(51) Int. Cl.
*G06K 9/68* (2006.01)
*G06K 9/00* (2006.01)
*G06K 9/62* (2006.01)

(52) U.S. Cl.
CPC .......... *G06K 9/00288* (2013.01); *G06K 9/6272* (2013.01); *G06K 9/6234* (2013.01)

(58) Field of Classification Search
None
See application file for complete search history.

(56) References Cited

U.S. PATENT DOCUMENTS 7,224,823 B2     5/2007   Hayata et al.
(Continued)

FOREIGN PATENT DOCUMENTS

| CN | 101901340 A | 12/2010 |
| EP | 1416427 A2 | 5/2004 |

(Continued)

OTHER PUBLICATIONS

China Office action, dated Jul. 23, 2014 along with an english translation thereof.
(Continued)

*Primary Examiner* — Bhavesh Mehta
*Assistant Examiner* — Andrew Moyer
(74) *Attorney, Agent, or Firm* — Greenblum & Bernstein, P.L.C.

(57) ABSTRACT

A collating device includes a collation list, a collation unit and a comparison unit. The collation list is configured to retain a false alarm list including a registered image, a threshold value serving as a criterion for determining whether to perform alarm activation, and a false alarm person image. The collation unit is configured to collate an input image with the registered image and the false alarm person image managed by the collation list, thereby obtaining a similarity therebetween. The comparison unit is configured to compare: a larger one of a value of the similarity between the input image and the false alarm person image, which is obtained by the collation unit, and the threshold value; and the similarity between the input image and the registered image, which is obtained by the collation unit, thereby determining whether to perform the alarm activation.

6 Claims, 27 Drawing Sheets

(56) References Cited

U.S. PATENT DOCUMENTS

| | | |
|---|---|---|
| 8,064,655 B2 | 11/2011 | Hatano et al. |
| 2003/0039380 A1* | 2/2003 | Sukegawa et al. ............ 382/118 |
| 2004/0086157 A1 | 5/2004 | Sukegawa |
| 2005/0129290 A1 | 6/2005 | Lo et al. |
| 2006/0115156 A1* | 6/2006 | Nakajima et al. ............ 382/190 |
| 2008/0080748 A1 | 4/2008 | Sukegawa et al. |
| 2008/0158351 A1 | 7/2008 | Rodriguez et al. |
| 2010/0158324 A1* | 6/2010 | Liu ............................... 382/118 |
| 2010/0172579 A1* | 7/2010 | Reid et al. .................... 382/165 |
| 2010/0316265 A1 | 12/2010 | Nakanowatari et al. |
| 2011/0320463 A1 | 12/2011 | Yoshio |
| 2013/0010095 A1 | 1/2013 | Aoki et al. |

FOREIGN PATENT DOCUMENTS

| | | |
|---|---|---|
| EP | 2091021 A1 | 8/2009 |
| EP | 2405390 A1 | 1/2012 |
| JP | 2002-183734 | 6/2002 |
| JP | 2004-118359 | 4/2004 |
| JP | 2006-178651 | 7/2006 |
| JP | 2007-521577 | 8/2007 |
| JP | 2008-071366 | 3/2008 |
| JP | 2008-108243 | 5/2008 |
| WO | 2007/071289 A1 | 6/2007 |

OTHER PUBLICATIONS

U.S. Appl. No. 13/193,962 to Kuo-Chu Lee et al., which was filed Jul. 29, 2011.

U.S. Appl. No. 13/194,010 to Kuo-Chu Lee et al., which was filed Jul. 29, 2011.

Elagin et al., "Automatic Pose Estimation System for Human Faces based on Bunch Graph Matching Technology", Eyematic Interfaces, Inc, University of Southern California, Laboratory for Computational and Biological Vision, 3rd International Conference on Face & Gesture Recognition (FG '98), 1998. pp. 136-141.

Viola et al., "Rapid Object Detection using a Boosted Cascade of Simple Features", Accepted Conference on Computer Vision and Pattern Recognition (CVPR), 2001, pp. 1-9.

Muller H et al: "Strategies for positive and negative relevance feedback in image retrieval", Pattern Recognition, 2000, Proceedings. $15^{th}$ International Conference on Sep. 3-7, 2000; [Proceedings of the International Conference on Pattern Recognition. (ICPR)], Los Alamitos, CA, USA, IEEE Comput. Soc, US, vol. 1, Sep. 3, 2000, pp. 1043-1045, XP010533727.

Julien Doublet et al: "Robust GrayScale Distribution Estimation for Contactless Palmprint Recognition", Biometrics: Theory, Applications, and Systems, 2007, BTAS 2007, First IEEE International Conference on, IEEE, PI, Sep. 1, 2007, pp. 1-6, XP031189965.

Search report from E.P.O., mail date is Nov. 27, 2014.

* cited by examiner

FIG. 3
| No. | REGISTERED FACE IMAGE | REGISTERED FACE FEATURE AMOUNT | THRESHOLD VALUE |
|---|---|---|---|
| 1 |  | (140, 35, · · ·) | 60 |
| 2 |  | (25, 512, · · ·) | 55 |
| ⋮ | ⋮ | | ⋮ |

FIG. 4
COLLATION LIST
| No. | REGISTERED FACE FEATURE AMOUNT | THRESHOLD VALUE |
|---|---|---|
| 1 | (140, 35, ···) | 60 |
| 2 | (25, 512, ···) | 55 |
| ⋮ | ⋮ | ⋮ |
FACE IMAGE DB
| No. | REGISTERED FACE IMAGE |
|---|---|
| 1 |  |
| 2 |  |
| ⋮ | |

FIG. 5
COLLATION LIST
| No. | REGISTERED FACE IMAGE | THRESHOLD VALUE |
|---|---|---|
| 1 |  | 60 |
| 2 |  | 55 |
| : | | : |

FIG. 10(a)
61 (V1)
| No. | | | REGISTERED FACE IMAGE | REGISTERED FACE FEATURE AMOUNT | THRESHOLD VALUE |
|---|---|---|---|---|---|
| 1 | | |  | (140, 35, ···) | 50 |
| 611 — INDIVIDUAL FALSE ALARM LIST | | A |  | (5, 65, ···) | |
| 2 | | |  | (25, 512, ···) | |
| 611 — INDIVIDUAL FALSE ALARM LIST | | B |  | (13, 55, ···) | |
| | | C |  | (69, 54, ···) | |
| : | | | : | : | |
FIG. 10(b)
61 (V2)
| No. | | | REGISTERED FACE IMAGE | REGISTERED FACE FEATURE AMOUNT | THRESHOLD VALUE |
|---|---|---|---|---|---|
| 1 | | |  | (140, 35, ···) | 50 |
| 2 | | |  | (25, 512, ···) | |
| : | | | : | : | |
| 612 — COMMON FALSE ALARM LIST | | A |  | (5, 65, ···) | |
| | | B |  | (13, 55, ···) | |
| | | : | : | : | |

FIG. 15(a)

| COLLATION LIST / VISITOR | | A | B | C | D |
|---|---|---|---|---|---|
| 1 | | 65 | 55 | 40 | 60 |
| 2 | | 42 | 49 | 50 | 40 |

FIG. 15(b)

| | | A | B | C | D |
|---|---|---|---|---|---|
| A | | | 68 | 48 | 51 |
| B | | | | 47 | 46 |
| C | | | | | 64 |
| D | | | | | |

FIG. 21
| No. | REGISTERED FACE IMAGE | REGISTERED FACE FEATURE AMOUNT | CONDITIONS | | THRESHOLD VALUE |
|---|---|---|---|---|---|
| 1 |  | (12, 34, ···) | MORNING | FINE | 65 |
| | | | | RAIN | 50 |
| | | | DAYTIME | FINE | 65 |
| | | | | RAIN | 65 |
| | | | NIGHT | --- | 40 |
| 2 |  | (45, 12, ···) | MORNING | FINE | 50 |
| | | | | RAIN | 55 |
| | | | DAYTIME | FINE | 55 |
| | | | | RAIN | 62 |
| | | | NIGHT | --- | 45 |
| ⋮ | ⋮ | ⋮ | ⋮ | ⋮ | ⋮ |

COLLATING DEVICE

TECHNICAL FIELD

The present invention relates to a collating device preferable for use in camera systems for the management of security-operations and for the management of important visiting customers.

BACKGROUND ART

Hitherto, there have been techniques for capturing an image of a person, detecting a face from a captured person's image, obtaining a face image feature amount of a face image from a face region, obtaining a similarity by collating the obtained face image feature amount with a face image feature amount registered in a collation list, and comparing the obtained similarity with a preliminarily set threshold value to thereby determine whether the person of which the image is captured is identical to a person registered in the collation list (see, e.g., Patent Documents 1 and 2).

FIG. 26 is a schematic diagram illustrating a configuration of a conventional collating device. As illustrated in this figure, the face of a person is detected from an image obtained as a result of image capture of the person by a camera. A face image feature amount is extracted from a face region of the detected face. A similarity is obtained by comparing the extracted face image feature amount with a face image feature amount registered in the collation list. Then, alarm determination is performed, based on the obtained similarity. If the similarity is equal to or more than a threshold value, alarm notification is performed. According to this figure, the threshold value is set at "50". The similarity between a person 500 whose face is detected and a person 501 registered in a collation list is "55". The similarity between another person 502 whose face is detected and the person 501 is "30". Thus, alarm notification is performed corresponding to the person 501 whose similarity exceeds the threshold value "50".

RELATED ART DOCUMENTS

Patent Documents

Patent Document 1: JP-A-2004-118359
Patent Document 2: JP-A-2006-178651

SUMMARY OF THE INVENTION

Problem to be Solved by the Invention

However, background art including techniques disclosed in Patent Documents 1 and 2 doesn't take results of past collation and image capture environment (such as an orientation, illumination, a date, and weather) into consideration. Therefore, the background art has problems that alarm failures and false alarms increase. For example, even in case where a person having an input face is the same as a person registered in a collation list, as illustrated in FIG. 27(*a*), if the similarity is "45" due to the difference in orientation, alarm activation isn't performed, resulting in an "alarm failure". Even in a case where a person having an input face is other than a person registered in a collation list, as illustrated in FIG. 27(*b*), if the similarity is "60" due to difference in the manner of illuminating each person or that of shining sun light on each person, alarm activation is performed, resulting in a "false alarm". In addition, the same "alarm failure" or "false alarm" repeatedly occurs.

The invention is accomplished in view of the above-described circumstances, and an object thereof is to provide a collating device capable of suppressing the occurrence of an "alarm failure" or a "false alarm" to a low level by taking a result of past collation and image capture environment into consideration.

Means for Solving the Problem

A collating device of the invention includes: a collation list configured to retain a false alarm list including a registered image, a threshold value serving as a criterion for determining whether to perform alarm activation, and a false alarm person image; a collation unit configured to collate an input image with the registered image or the false alarm person image managed by the collation list, thereby obtaining a similarity therebetween; and a comparison unit configured to compare: a larger one of a value of a similarity between the input image and the false alarm person image, which is obtained by the collation unit, and the threshold value; and the similarity between the input image and the registered image, which is obtained by the collation unit, thereby determining whether to perform the alarm activation.

In the collating device, the collation list includes the false alarm list for each registered image.

In the collating device, the collation list includes the false alarm list common to the registered images.

In the collating device, the collation list adds the input image to the false alarm list as false alarm information if the alarm activation is activation of a false alarm.

In the collating device, the collation list retains a registered image feature amount and a false alarm person image feature amount, instead of the registered image and the false alarm person image, respectively.

A collating device includes: a collation list configured to retain a registered image, and a threshold value corresponding to each registered image and serves as a criterion for determining whether to perform alarm activation; a collation unit configured to refer to an input image and the registered image managed by the collation list, thereby obtaining a similarity therebetween; and a comparison unit configured to compare the similarity obtained by the collation unit with the threshold value managed by the collation list, thereby determining whether to perform the alarm activation.

The collating device further includes: a user input receiving unit configured to receive an input from a user; and a collation list update unit configured to update the threshold value managed by the collation list according to a content received by the user input receiving unit.

The collating device further includes a condition acquisition unit configured to acquire a condition when an image is captured, the collation list retains the threshold value so as to correspond to each condition, and the comparison unit compares the similarity obtained by the collation unit with the condition acquired by the condition acquisition unit, thereby determining whether to perform the alarm activation.

The collating device further includes an others similarity distribution calculation unit configured to generate the threshold value to be managed by the collation list.

In the collating device, the others similarity distribution calculation unit obtains a similarity between a sample image categorized by the condition and the registered image, and sets a result of statistically processing the obtained similarity to be the threshold value.

In the collating device, the collation list retains a feature amount of the registered image instead of the registered image.

A collation method of the invention includes: a collation list step of retaining a false alarm list including a registered image, a threshold value serving as a criterion for determining whether to perform alarm activation, and a false alarm person image; a collation step of collating an input image with the registered image or the false alarm person image managed by the collation list, thereby obtaining a similarity therebetween; and a comparison step of comparing: a larger one of a value of a similarity between the input image and the false alarm person image, which is obtained in the collation step, and the threshold value; and the similarity between the input image and the registered image, which is obtained in the collation step, thereby determining whether to perform the alarm activation.

Advantages of the Invention

According to the invention, it is possible to suppress occurrence of an alarm failure or a false alarm due to variety of image capture environment.

BRIEF DESCRIPTION OF THE DRAWINGS

FIG. 3 is a diagram illustrating an example of a collation list illustrated in FIG. 1.

FIG. 4 is a diagram illustrating Variation V1 in the collation list of the collating device illustrated in FIG. 1.

FIG. 5 is a diagram illustrating Variation V2 in the collation list of the collating device illustrated in FIG. 1.

FIGS. 10(a) and 10(b) are diagrams each illustrating an example of an associated one of two Variations of the collation list of the collating device according to Embodiment 2 of the invention.

FIGS. 15(a) and 15(b) are diagrams each for illustrating an example of an application using a false alarm list of the collating device illustrated in FIG. 9.

FIG. 21 is a diagram illustrating an example of a collation list of a collating device illustrated in FIG. 20.

MODE FOR CARRYING OUT THE INVENTION

Hereinafter, preferred modes for carrying out the invention are described in detail with reference to the drawings.

Embodiment 1

Figure 1:
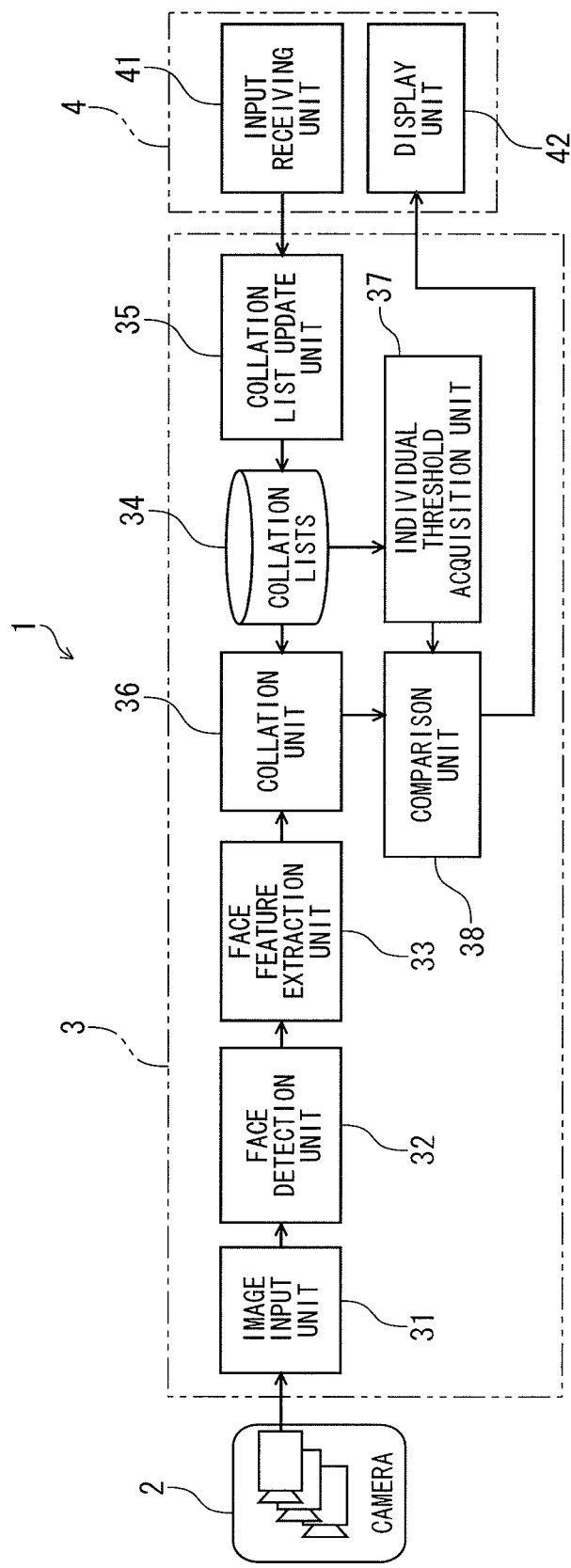
FIG. 1 is a block diagram illustrating a schematic configuration of a collating device according to Embodiment 1 of the invention.

FIG. 1 is a block diagram illustrating a schematic configuration of a collating device according to Embodiment 1. In this figure, a collating device 1 according to the present embodiment includes an image capture device 2 having at least one camera, a face recognition device 3, and a display terminal 4. The face recognition device 3 includes an image input unit 31, a face detection unit 32, a face feature extraction unit 33, a collation list 34, a collation list update unit 35, a collation unit 36, an individual threshold acquisition unit 37, and a comparison unit 38.

The image input unit 31 receives an image obtained as a result of image capture by the image capture device 2. The face detection unit 32 detects a face of a person from an image input to the image input unit 31 and outputs face region information representing a face region corresponding to the detected face. In this case, if the face region is, e.g., an eye, the face region information is eye region information corresponding to the eye. If the face region is, e.g., a nose, the face region information is nose region information corresponding to the nose. If the face region is, e.g., a mouth, the face region information is mouth region information corresponding to the mouth. The face detection unit 32 outputs a captured image output from the image capture device 2, in addition to outputting face region information corresponding to the detected face.

Incidentally, in the field of face detection, it has been reported that a face region can be detected in an image according to a detection method based on an AdaBoost learning method (see, e.g., Non-Patent Document 1: Paul Viola and Michael Jones; "Rapid Object Detection Using a Boosted Cascade of Simple Features"; IEEE Computer Society Conference on Computer Vision and Pattern Recognition (CVPR); December, 2001; ISSN: 1063-6919; Vol. 1; pp. 511-518). The face detection unit 32 detects face regions such as the eyes and the nose of each person in captured images output from the image capture device 2, using this detection method. However, this detection method is an example. As long as a face region can be specified in an image, any detection method can be employed. For example, a face can be detected by, e.g., pattern-matching.

The face feature extraction unit 33 obtains a face image feature amount (hereinafter referred to as an "input face feature amount") from a face region in a captured image. Then, the face feature extraction unit 33 outputs the obtained input face feature amount to the collation unit 36. Incidentally, in the field of face recognition, it has been reported that a face can be recognized with high accuracy, based on a feature amount calculated by a gabor wavelet transform (see, e.g., Non-patent Document 2: E. Elagin, J. Steffens, H. Neven; "Automatic Pose Estimation System for Human Faces Based on Bunch Graph Matching Technology"; Proceedings of the International Conference on Automatic Face and Gesture Recognition '98; pp. 136-141; 1998).

The collation list 34 manages all or two of the following types of information, i.e., the registered face image, the registered face feature amount, and the threshold value serving as a criterion for determining whether alarm activation is performed. Variations of the collation list 34, which manage two of such types of information, are described hereinbelow.

Variation V1: this variation of the collation list 34 manages the registered face feature amount and the threshold values. The registered face images are managed by another database.

Variation V2: this variation of the collation list 34 manages the registered face images and the threshold values. The collation unit 36 obtains the registered face feature amount in real time, using the face feature extraction unit 33.

The face recognition device 3 according to the present embodiment is assumed to use Variation V1 of the collation list 34.

The collation list update unit 35 receives an input from a user and updates the threshold value in the collation list 34. The collation unit 36 obtains the similarity between the input face feature amount and the registered face feature amount and outputs a result to the comparison unit 38. The individual threshold acquisition unit 37 acquires a threshold value in the collation list 34 and outputs the acquired threshold value to the comparison unit 38. The comparison unit 38 compares the similarity output from the collation unit 36 with the threshold value output from the individual threshold acquisition unit 37. If the similarity exceeds the threshold value, the comparison unit 38 activates an alarm.

Figure 2:
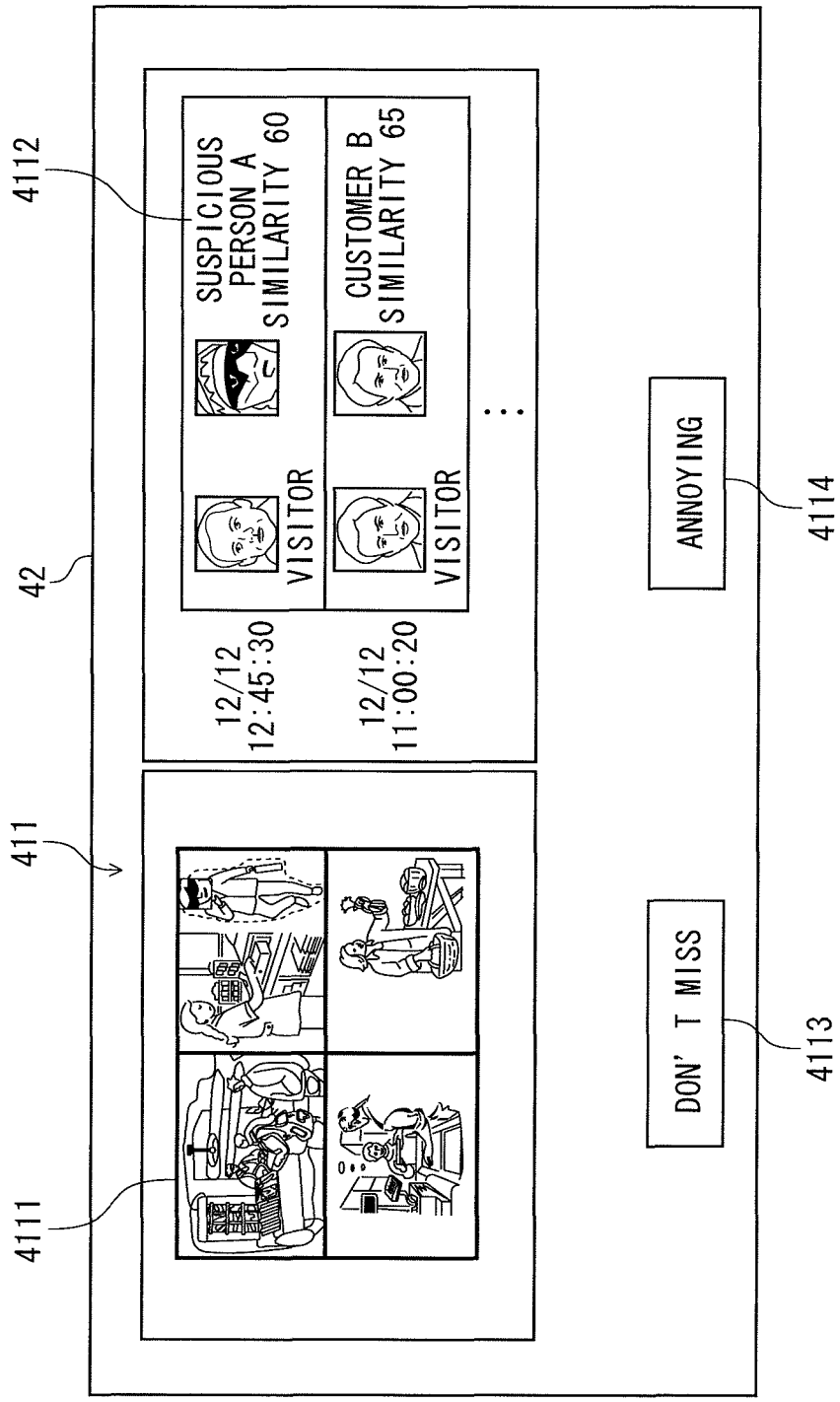
FIG. 2 is a diagram illustrating a specific example of a user interface of an input receiving unit of a display terminal illustrated in FIG. 1.

The display terminal 4 includes an input receiving unit 41 and a display unit 42. The input receiving unit 41 includes a user interface and receives a user input through the user interface. FIG. 2 is a diagram illustrating a specific example of a user interface 411 of the input receiving unit 41. In this figure, the user interface 411 performs multiscreen display 4111 on the display unit 42. Also, the user interface 411 performs alarm-activation and history-display 4112 thereon. In addition, the user interface 411 displays a "DON'T MISS" button 4113 and an "ANNOYING" button 4114 and receives user inputs respectively entered therewith. During the multiscreen display 4111, the display terminal 4 displays four-divided monitor images (respectively captured by four cameras). During the alarm-activation and history-display 4112, the display terminal 4 displays an image of the face of a visitor and an alarm activation time. Incidentally, the monitor image may be either of a live image and a reproduced image.

The "DON'T MISS" button 4113 and the "ANNOYING" button 4114 are used to update the threshold value serving as a criterion for alarm activation. Each user input is received by the input receiving unit 41 by clicking with a pointing device such as a mouse (not shown) on an associated one of the buttons. The "DON'T MISS" button 4113 is used if no alarm is activated even in a case where the visitor is a suspicious person or a customer. In such a case, the threshold value corresponding to the visitor is reduced by operating the "DON'T MISS" button 4113. Consequently, the probability of activating an alarm is increased. On the other hand, the "ANNOYING" button 4114 is used in the case of activating an alarm regardless of the fact that the visitor is neither a suspicious person nor a customer. In such a case, the threshold value corresponding to the visitor is increased. Consequently, the probability of activating an alarm is reduced.

The display unit 42 of the display terminal 4 displays the contents of an alarm when the comparison unit 38 of the face recognition device 3 activates the alarm. The contents of an alarm include a "similarity", a "captured image", and a "face image registered in the collation list". In this case, the "captured image" is acquired by the image input unit 31, while the "face image registered in the collation list" is acquired from the collation list 34.

FIG. 3 is a diagram illustrating an example of the collation lists 34. The collation lists 34 are each configured by columns the "number (No.)", the "registered face image", the "registered face feature amount" and the "threshold". The registered face feature amount is a numerical feature amount obtained from a certain portion (i.e., eyes, a nose, a mouth, or the like) of the face.

FIG. 4 is a diagram illustrating an example of Variation V1 of the collation lists 34. As illustrated in this figure, the collation lists 34 manage the "registered face feature amount" and the "threshold value". Incidentally, as described above, the registered face image is managed by another database (not shown).

Incidentally, FIG. 5 illustrates, as reference, collation lists which are Variation V2. As illustrated in this figure, the collation lists which are Variation V2 manage the "registered face image" and the "threshold value". The "registered face feature amount" are obtained in real time, using the face feature extraction unit 33.

Next, an operation of the collating device 1 according to the present embodiment is described hereinafter.

Figure 6:
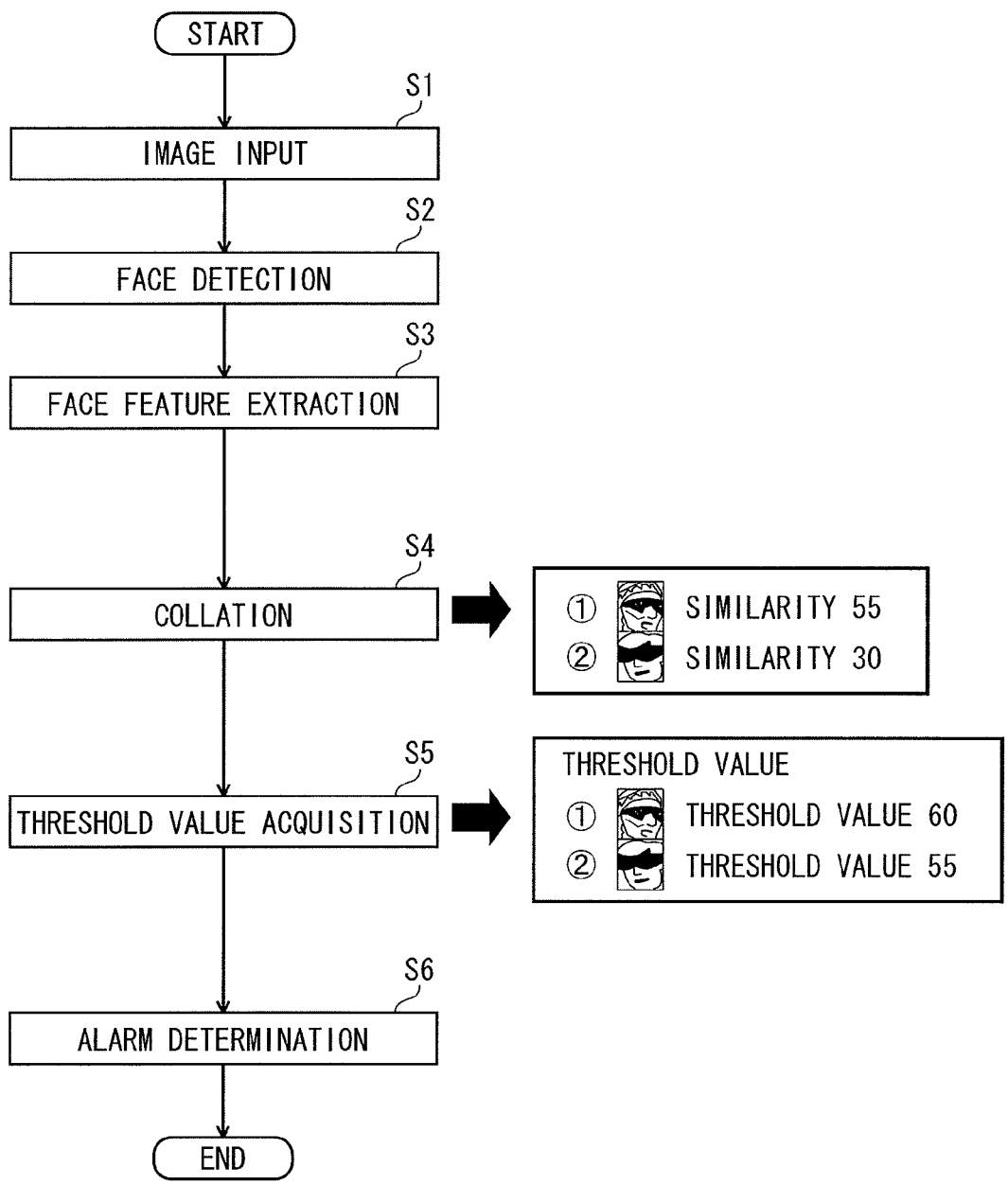
FIG. 6 is a flowchart for illustrating an operation of the collating device illustrated in FIG. 1.

FIG. 6 is a flowchart for illustrating an operation of the collating device 1 according to the present embodiment. In this figure, in step S1, first, the image input unit 31 receives a captured image from the image capture device 2. Then, in step S2, the face detection unit 32 detects the face of a person in the captured image. Then, the face detection unit 32 outputs face region information. The face detection unit 32 also outputs the captured image.

The face detection unit 32 outputs the face region information and the captured image. In step S3, the face feature extraction unit 33 extracts a face feature from each face region in the captured image. Then, the face feature extraction unit 33 outputs a face image feature amount based on a result of the extraction, i.e., an input face feature amount to the collation unit 36. After the input face feature amount is output from the face feature extraction unit 33 to the collation unit 36, in step S4, the collation unit 36 collates the input face feature amount with the registered face feature amount and obtains a similarity therebetween. Then, the collation unit 36 outputs the obtained similarity to the comparison unit 38. Here, it is assumed that the similarity between the input face feature amount and the registered face feature amount in the collation list No. 1 is "55", and the similarity between the input face feature amount and the registered face feature amount in the collation list No. 2 is "30", as illustrated in the right-side neighbor of step S4.

In step S5, after the result of the collation performed by the collation unit 36 is output to the comparison unit 38, the individual threshold acquisition unit 37 acquires the threshold value corresponding to each registered face image from the collation lists 34 and outputs the obtained threshold value to the comparison unit 38. Here, it is assumed that the threshold value corresponding to the registered face image in the collation list No. 1 is "60", and the threshold value corresponding to the registered face image in the collation list No. 2 is "55", as illustrated in the right-side neighbor of step S5.

In step S6, after the threshold value acquired by the individual threshold acquisition unit 37 is output to the comparison unit 38, the comparison unit 38 compares the similarity output from the collation unit 36 with the threshold value output from the individual threshold acquisition unit 37 and determines whether the similarity exceeds the threshold value. If determining that each similarity exceeds the associated threshold value, the comparison unit 38 activates an alarm. However, in this case, the similarity "55" of the registered face image corresponding to the collation list No. 1 is less than the threshold value "60". In addition, the similarity "30" of the registered face image corresponding to the collation list No. 2 is less than the threshold value "55". Therefore, each of both the similarities doesn't exceed the associated threshold value. Thus, no alarm is activated.

Figure 7:
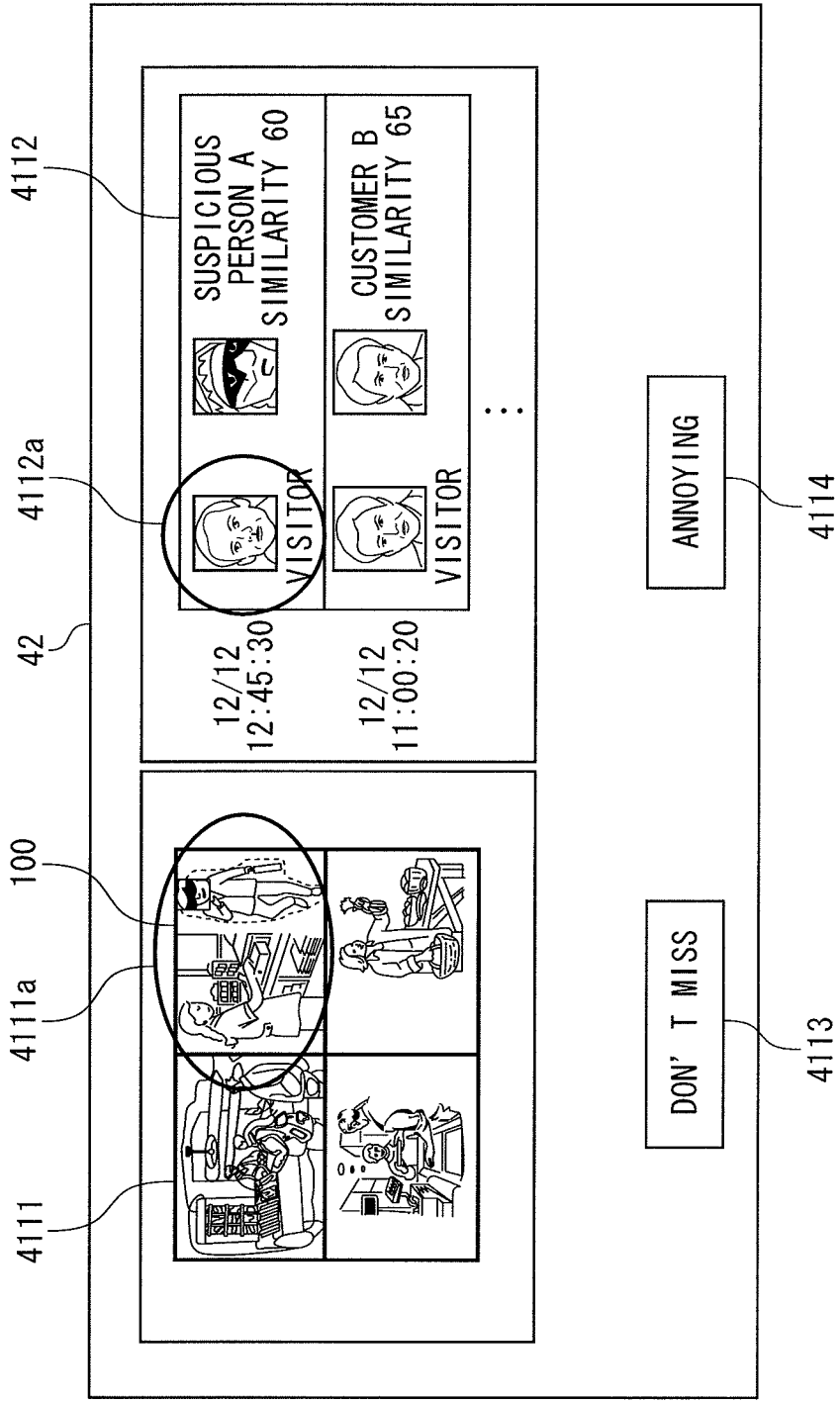
FIG. 7 is a diagram for illustrating an operation of the collating device illustrated in FIG. 1.

In a case where no alarm is activated even if a person 100 registered in the collation lists 34 appears on a screen 4111a while a user checks images obtained by the multiscreen display 4111 in FIG. 7 (in this case, the image may be either a live image or reproduced image), the user selects the person 100 and pushes the "DON'T MISS" button 4113. Consequently, the collation list update unit 35 lowers the threshold value corresponding to this person registered in the collation lists 34. By this action, an alarm is activated corresponding to the person 100. In this case, e.g., a method of automatically selecting a person whose face having the highest similarity to the face of the person 100 selected by a user, or a method of sequentially displaying faces in the descending order of the similarity and causing a user to select one of the faces is considered as a method of searching for a person.

If a user finds on a screen 4112a a result of activating a false alarm while the user checks images obtained by the alarm-activation and history-display 4112 (in this case, the image may be either a live image or reproduced image), the user pushes the "ANNOYING" button 4114. Consequently, a threshold value corresponding to an associated person registered in the collation lists 34 is raised by the collation list update unit 35. By this action, alarm activation isn't performed corresponding to this person.

Figure 8:
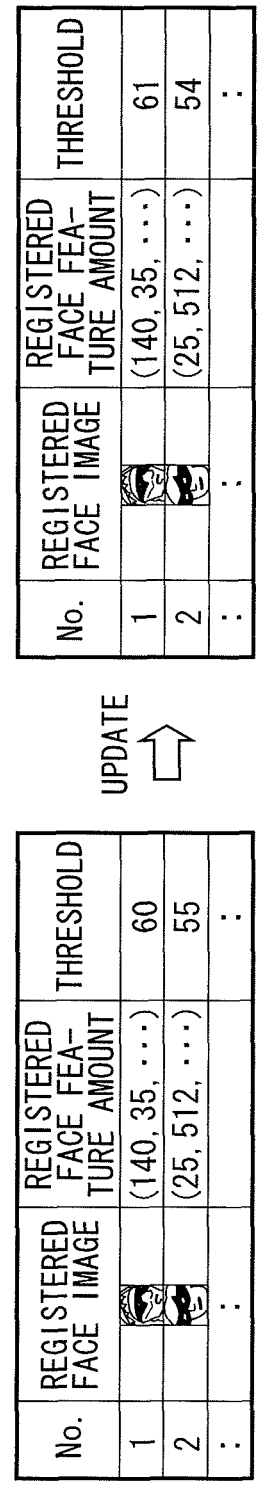
FIG. 8 is a diagram illustrating an example of update of the collation list, which is performed at a collation list update unit of the collating device illustrated in FIG. 1.

FIG. 8 is a diagram illustrating an example of collation list update performed by the collation list update unit 35. As illustrated in this figure, a user selects a person and pushes the "ANNOYING" button 4114, so that the threshold value "60" corresponding to the registered face image in the collation list No. 1 is updated to "61". In addition, the user pushes the "DON'T MISS" button 4113, so that the threshold "55" corresponding to the registered face image in the collation list No. 2 is updated to "54". Increasing the threshold value lowers the probability of activating an alarm. On the other hand, reducing the threshold value raises the probability of activating an alarm.

Thus, the collating device 1 according to Embodiment 1 is adapted to optionally change, according to a user input, the threshold value which is to be compared with the similarity between the input face feature amount and the registered face feature amount and serves as a criterion for determining whether an alarm is activated. Accordingly, even if the image capture environment of the image capture device 2 changes, the degree of occurrence of an alarm failure or a false alarm can be suppressed to a low level by changing the threshold value.

Embodiment 2

Figure 9:
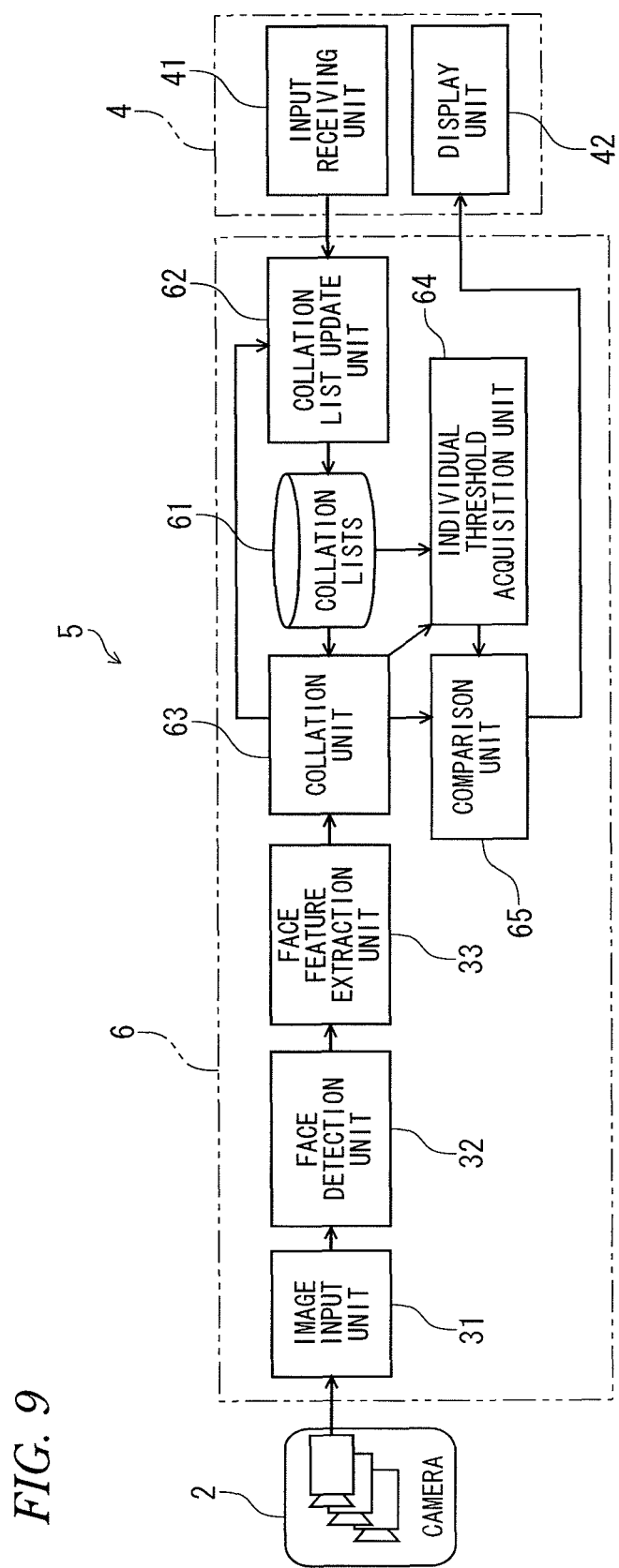
FIG. 9 is a block diagram illustrating a schematic configuration of a collating device according to Embodiment 2 of the invention.

FIG. 9 is a block diagram illustrating a schematic configuration of a collating device according to Embodiment 2 of the invention. Incidentally, in this figure, portions common to this collating device and the collating device 1 according to the above Embodiment 1 are designated with the same reference numeral.

In FIG. 9, a collating device 5 includes an image capture device 2, a face recognition device 6, and a display terminal 4. The face recognition device 6 includes an image input unit 31, a face detection unit 32, a face feature extraction unit 33, collation lists 61, a collation list update unit 62, a collation unit 63, an individual threshold acquisition unit 64, and a comparison unit 65.

The collation lists 61 manage the registered face images, the registered face feature amount, and the threshold values associated with the registered face image and the face feature amount. There are two variations of the collation lists 61, which are described hereinbelow.

Variation V1: this variation of the collation lists 61 manages the registered face feature images and individual false alarm lists associated with each registered face image. Thus, Variation V1 of the collection lists 61 manages the registered face image feature amount, the threshold value and the individual false alarm list associated with each registered face image.

Variation V2: this variation of the collation lists 61 manages the registered face images and a common false alarm list that is common to all of the registered face images. Thus, Variation V2 of the collation lists 61 manages the registered face feature amount, the threshold value and the common false alarm list that is common to each registered face image.

FIG. 10 is a diagram illustrating an example of each of the two variations of the collation lists 61. FIG. 10(a) illustrates Variation V1. FIG. 10(b) illustrates Variation V2. Variation V1 of the collation lists 61, which is illustrated in FIG. 10(a), manages an individual false alarm list 611 corresponding to each registered face image. Variation V2 of the collation lists 61, which is illustrated in FIG. 10(b), manages a common false alarm list 612 common to each registered face image. Incidentally, FIGS. 10(a) and 10(b) illustrate examples of Variation V1 and Variation V2, according to each of which has one threshold value "50". However, the registered face images may individually have a threshold value.

Turning back to FIG. 9, the collation unit 63 obtains the similarity between the input face feature amount obtained by the face feature extraction unit 33 and the registered face images managed by the collation list 61 and outputs a result to the comparison unit 65. In addition, the collation unit 63 obtains the similarity between the input face feature amount and the registered face feature amount managed by the individual false alarm list 611 or the similarity between the input face feature amount and the registered face feature amount registered in the common false alarm list 612. The collation unit 63 outputs the obtained similarity to the individual threshold acquisition unit 64.

The comparison unit 65 compares the similarity between the input face image obtained by the collation unit 63 and the registered face image with the threshold value acquired from the individual threshold acquisition unit 64. If this similarity exceeds the threshold value, the comparison unit 65 activates an alarm. The individual threshold acquisition unit 64 acquires the threshold value from the collation lists 61 and compares the similarity between the input image and the face image registered in the false alarm list, which is acquired from the collation unit 63. Then, the individual threshold acquisition unit 64 outputs a larger one of the value of this similarity and the threshold value acquired from the collation lists as a threshold value to the comparison unit 65. If a result corresponding to the user input received by the input receiving unit 41 to be described below is a false alarm, the collation list update unit 62 adds the input face image to the false alarm list in the associated collation list 61 as the content of the false alarm. If a variation of the false alarm list is an individual false alarm list, the collation list update unit 62 adds the input face image to an individual false alarm list that corresponds to the registered face image, the alarm activated corresponding to which is determined as a false alarm. If a variation of the false alarm list is a common false alarm list, the collation list update unit 62 adds the input face image to the common false alarm list. Incidentally, if an upper limit is set to the number of false alarm lists in the collation lists 61, it is advisable to, e.g., obtain the similarity between the face image in the false alarm list and the registered face image and to update the false alarm list corresponding to the lowest one of the obtained similarities.

At the alarm activation, the input receiving unit 41 of the display terminal 4 receives a user input which indicates that the activated alarm is a false alarm. The display unit 42 of the display terminal 4 displays the contents of the alarm and prompts a user to enter input information representing whether the alarm is a false alarm.

Figure 11:
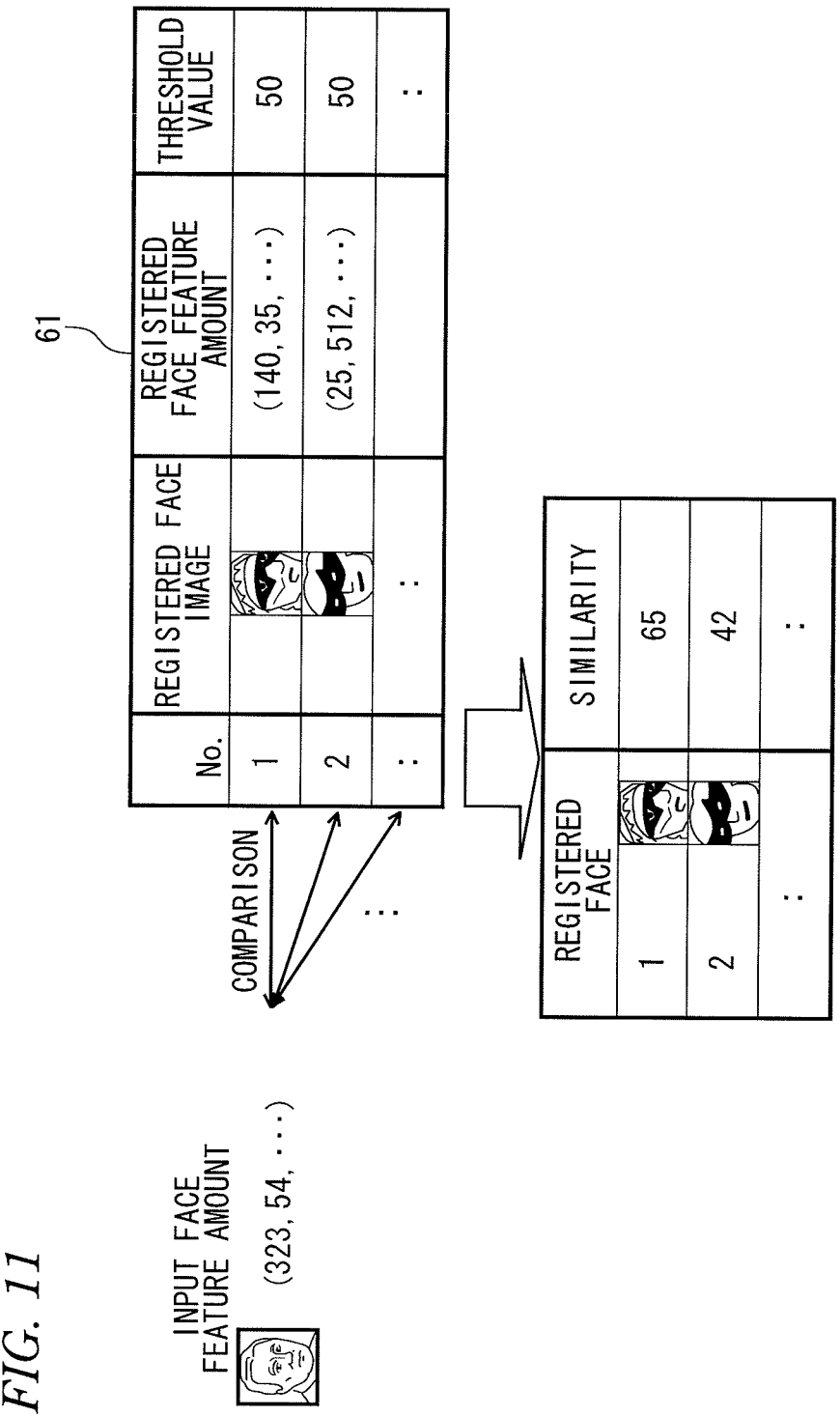
FIG. 11 is a diagram schematically illustrating an outline of processing of comparison between an input face feature amount and a registered face feature amount in a collation unit of the collating device illustrated in FIG. 9.

FIG. 11 is a diagram schematically illustrating an outline of processing of comparison between an input face feature amount and a registered face feature amount in a collation unit 63 of the collating device illustrated in FIG. 9. Referring to FIG. 11, the collation unit 63 compares the input face feature amount "(323, 54, . . . )" with the registered face feature amount corresponding to each registered face image in the collation lists 61. Thus, the collation unit 63 obtains the similarity between each input face feature amount and each registered face feature amount. In this figure, the similarity between an input face and the registered face image in the collation list No. 1 is "65". The similarity between the input face and the registered face image in the collation list No. 2 is "42".

Figure 12:
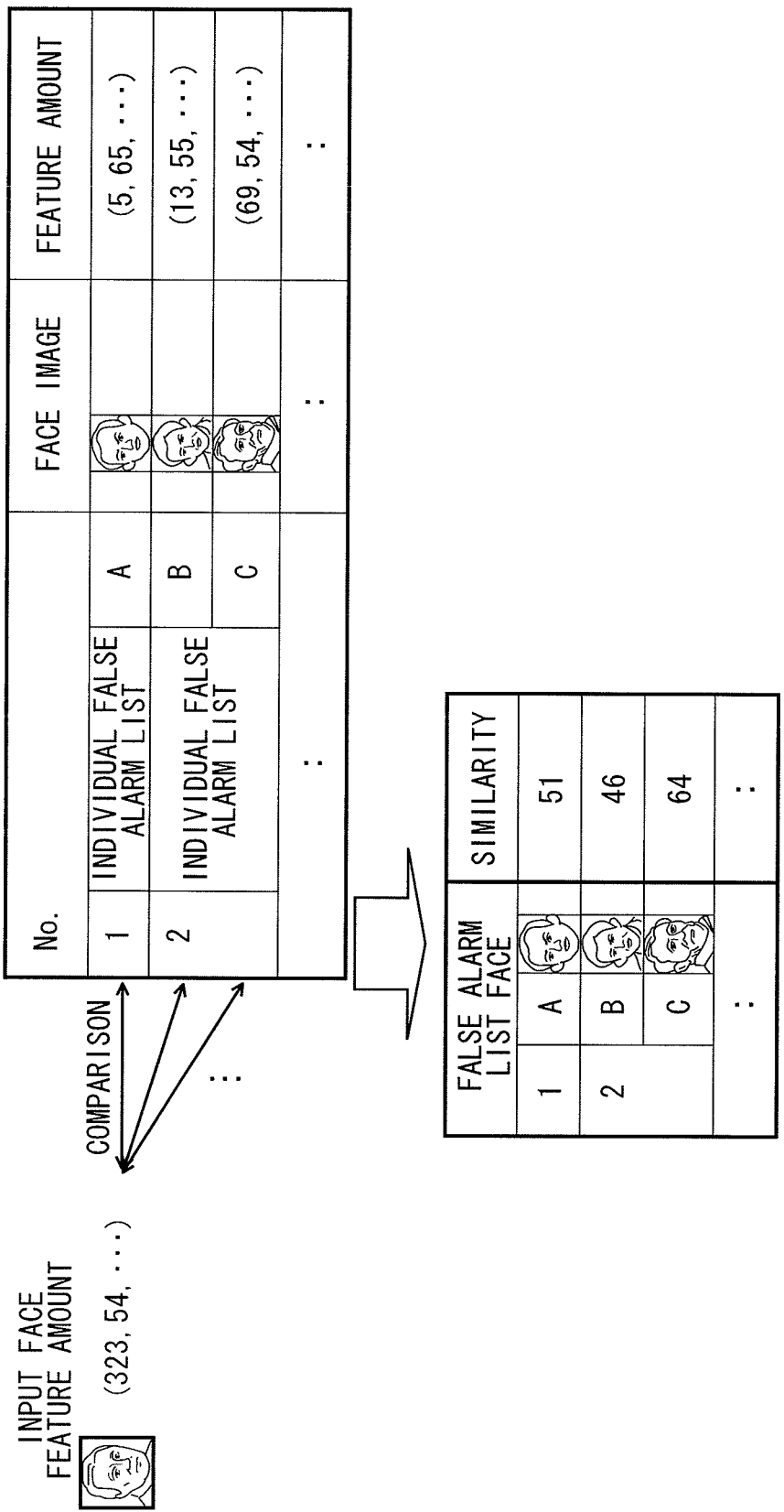
FIG. 12 is a diagram schematically illustrating an outline of processing of comparison between an input face feature amount and an individual false alarm list in the collation unit of the collating device illustrated in FIG. 9.

FIG. 12 is a diagram schematically illustrating an outline of processing of comparison between the input face feature amount and the feature amount in the individual false alarm list 611 in the collation unit 63. As illustrated in this figure, the collation unit 63 compares the input face feature amount "(323, 54, . . . )" with an associated one of the feature amounts corresponding to each face image in each individual false alarm list 611. Thus, the collation unit 63 obtains the similarity corresponding to each feature amount. Consequently, the collation unit 63 obtains the similarity between each input face feature amount and an associated feature amount corresponding to each face image and to each individual false alarm list 611. That is, the similarity corresponding to each false alarm list and to each face is obtained. According to this figure, the similarity between the input feature amount and the feature amount "(5, 65, . . . )" described on row A in the individual false alarm list No. 1 is "51". The similarity between the input feature amount and the feature amount "(13, 55, . . . )" described on row B in the individual false alarm list No. 2 is "46". The similarity between the input feature amount and the feature amount "(69, 54, . . . )" described on row C in the individual false alarm list No. 3 is "64".

Figure 13:
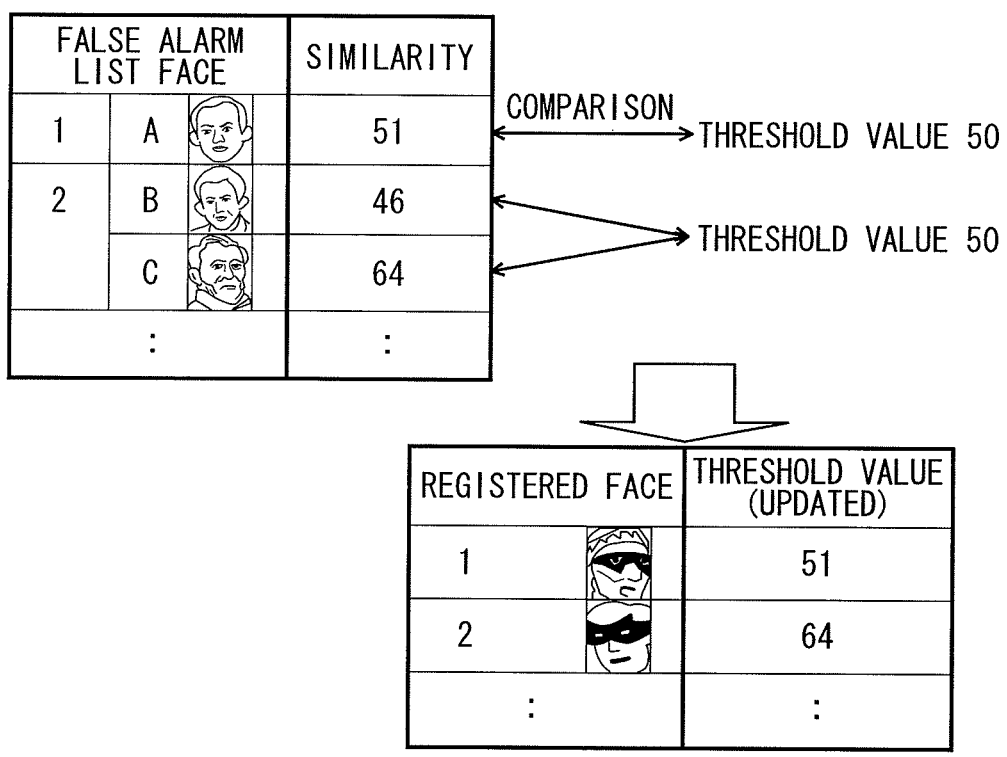
FIG. 13 is a diagram schematically illustrating threshold value update processing performed in a collation list update unit of the collating device illustrated in FIG. 9.

FIG. 13 is a diagram schematically illustrating an outline of threshold value update processing performed in the collation list update unit 62. In this figure, each of the similarities "51, 46, 64, . . . " respectively corresponding to false alarm list faces is compared with the threshold value "50". The threshold value is updated according to a result of the comparison. For example, the threshold value "51" corresponding to row A of the false alarm list face No. 1 is compared with the threshold value "50". Because the similarity "51" exceeds the threshold value "50", the threshold value is updated to "51". Each of two threshold values "46" and "64" respectively corresponding to rows B and C of the false alarm list face No. 2 is compared with the threshold value "50". Because of the presence of the similarity "64" that exceeds the threshold value "50", the threshold value is updated to "64". Thus, the threshold value corresponding to each registered face is obtained.

Figure 14:
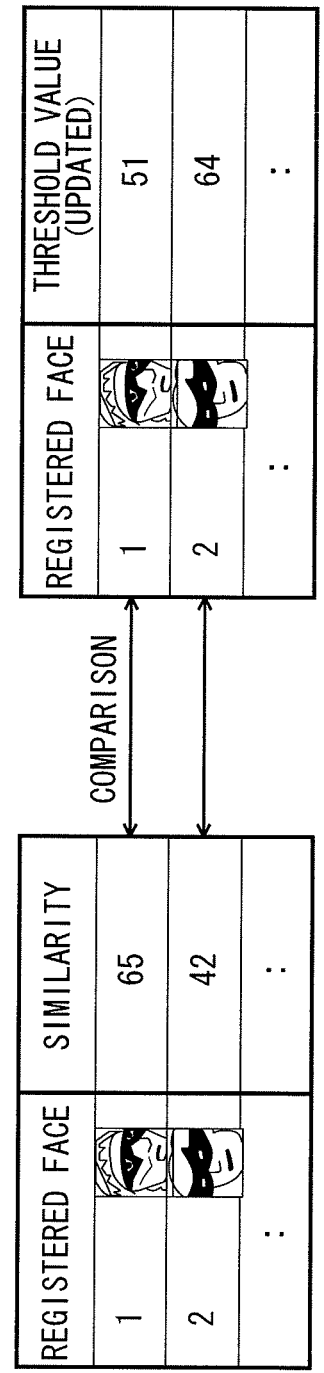
FIG. 14 is a diagram schematically illustrating an outline of processing performed in a comparison unit of the collating device illustrated in FIG. 9.

FIG. 14 is a diagram schematically illustrating an outline of processing performed in the comparison unit 65. In this figure, the comparison unit 65 compares the similarity between the input face and the registered face with the threshold corresponding to each registered face. If the similarity exceeds the threshold, alarm activation is performed. For example, the similarity "65" between the input face and the registered face in the collation list No. 1 exceeds the threshold value "51". Thus, alarm activation is performed. However, the similarity "42" between the input face and the registered face in the collation list No. 2 doesn't exceed the threshold value "64". Therefore, alarm activation isn't performed.

Figure 19:
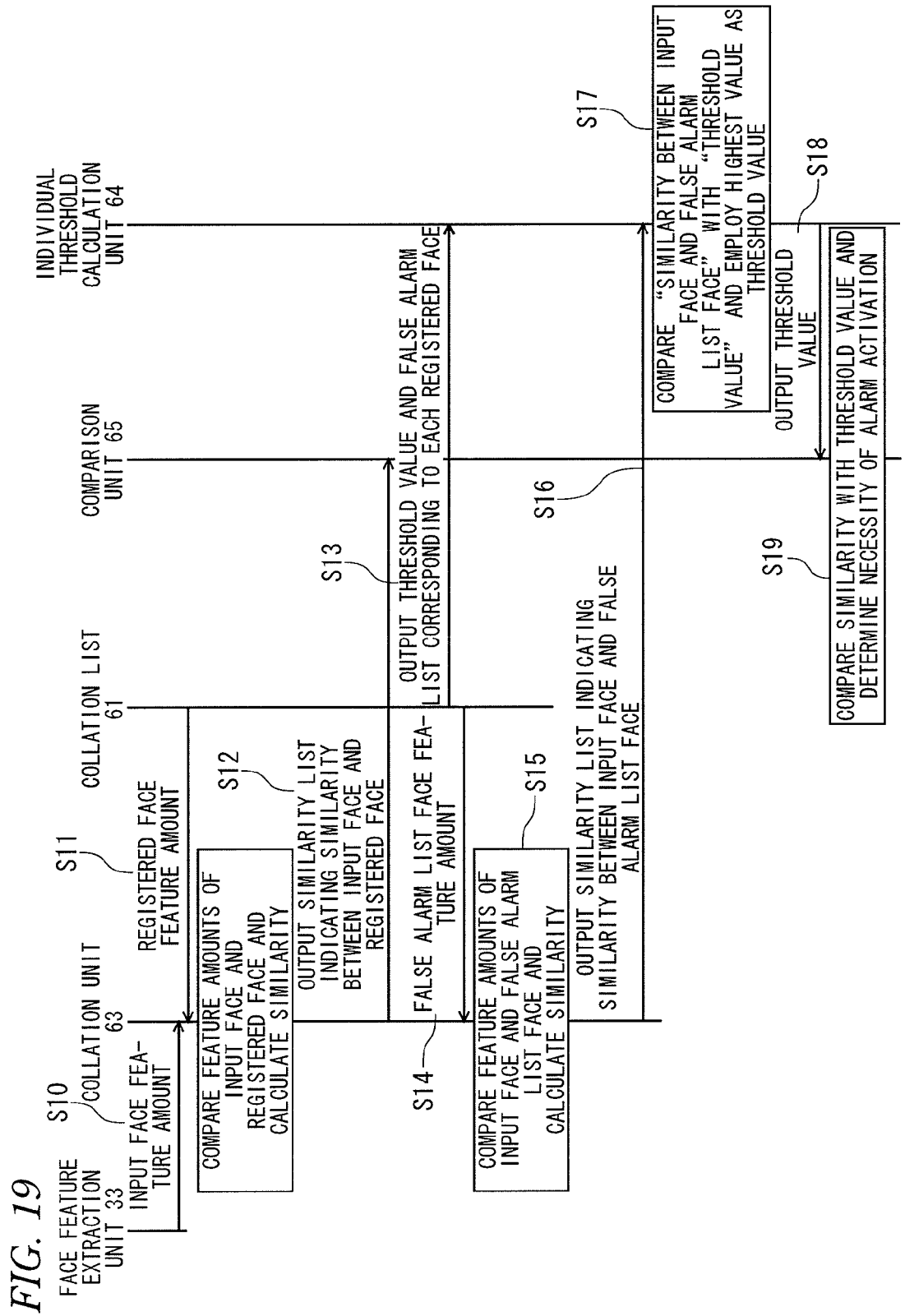
FIG. 19 is a sequence diagram for illustrating an operation of the collating device illustrated in FIG. 9.

FIG. 19 is a sequence diagram for illustrating an operation of the collating device 5 according to the present embodiment. In this figure, in step S10, the face feature extraction unit 33 outputs an input race feature amount to the collation unit 63. Then, in step S11, the collation lists 61 output a registered face feature amount to the collation unit 63. In step S12, the collation unit 63 calculates a similarity by comparing the input face feature amount with the registered face feature amount. The collation unit 63 outputs the calculated similarity to the comparison unit 65 together with a list of the similarity between the input face and the registered face. After the similarity and the similarity list corresponding to the registered face are output from the collation unit 63, in step S13, the associated collation lists 61 outputs a threshold value and the false alarm list, which correspond to each registered face, to the individual threshold acquisition unit 64. In addition, in step S14, the associated collation list 61 outputs a false alarm list face feature amount to the collation unit 63.

After the false alarm list face feature amount is transmitted from the collation lists 61, in step S15, the collation unit 63 compares the feature amounts of the input face and the false alarm list face and calculates the similarity therebetween. Then, in step S16, the collation unit 63 outputs a list of the similarities between the input face and the false alarm list face to the individual threshold acquisition unit 64. After the list of the similarities between the input face and the false alarm list face is output from the collation unit 63, in step S17, the individual threshold acquisition unit 64 compares the similarity between the input face and the false alarm list face with the threshold value and employs the highest value as the threshold. Then, in step S18, the individual threshold acquisition unit 64 outputs the employed threshold value to the comparison unit 65. After the threshold value is transmitted from the individual threshold acquisition unit 64, in step S19, the comparison unit 65 compares the similarity and the threshold value and determines necessity of alarm activation. At this determination, if the similarity is less than the threshold value, alarm activation isn't performed. If the similarity is equal to or higher than the threshold value, alarm activation is performed.

FIGS. 15(a) and 15(b) are diagrams each for illustrating an example of an application using the false alarm list of the collating device 5 according to the present embodiment. FIGS. 15(a) and 15(b) are tables indicating the similarities between persons. All of the threshold values for each registered person are assumed to be "50". An example is illustrated, in which persons 1 and 2 are registered in the collation lists corresponding to each of three patterns "Background Art", "Individual False Alarm List", and "Common False Alarm list", and in which visitors A, B, C, and D enter a store in this order.

Figure 16:
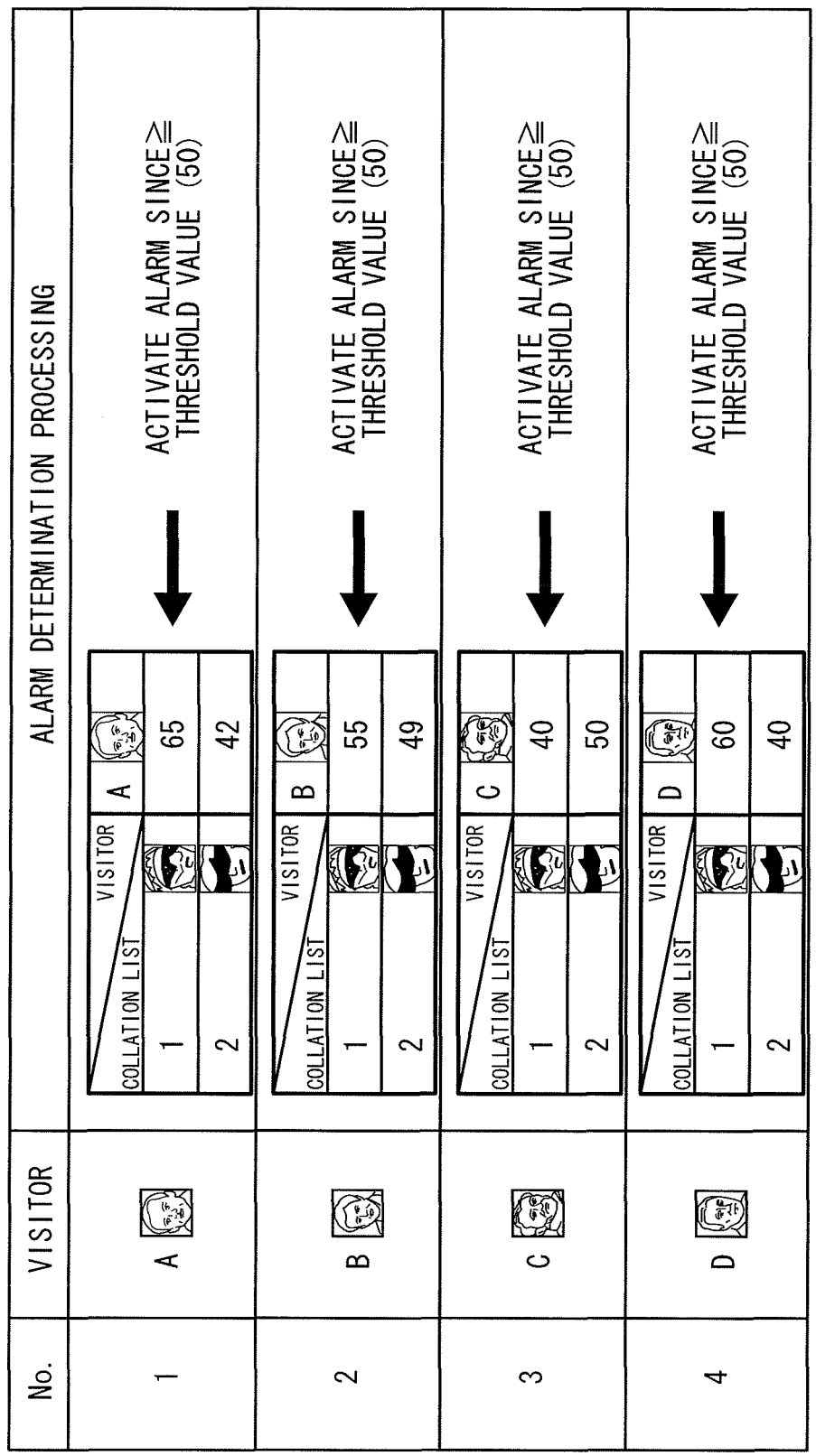
FIG. 16 is a diagram schematically illustrating an outline of alarm determination processing according to background art.

FIG. 16 is a diagram schematically illustrating an outline of alarm determination processing according to the "Background Art". In this figure, the similarity "65" between the visitor A and the registered face in the collation list No. 1 is compared with the threshold value "50". The similarity "65" is equal to or higher than the threshold value "50". Thus, alarm activation is performed. Next, the similarity "55" between the face of the visitor B and the registered face in the collation list No. 1 is compared with the threshold value "50". Because the similarity "55" is equal to or higher than the threshold value "50", alarm activation is performed. Next, the similarity "50" between the face of the visitor C and the registered face in the collation list No. 2 is compared with the threshold value "50". Because the similarity "50" is equal to or higher than the threshold value "50", alarm activation is performed. Next, the similarity "60" between the face of the visitor D and the registered face in the collation list No. 1 is compared with the threshold value "50". Because the similarity "60" is equal to or higher than the threshold value "50", alarm activation is performed. Thus, according to the "Background Art", false alarms are activated a total of four times.

Figure 17:
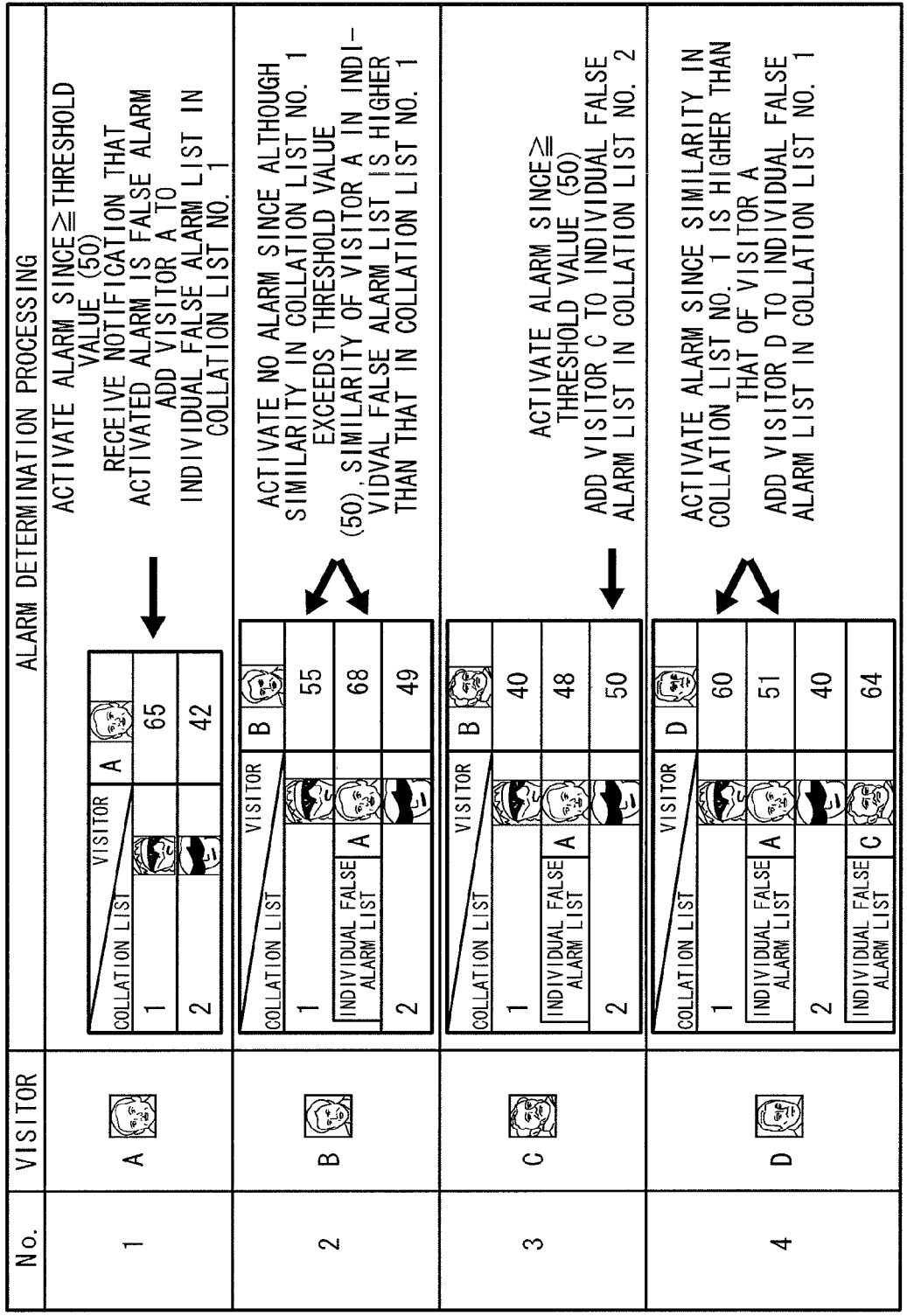
FIG. 17 is a diagram schematically illustrating an outline of alarm determination processing employing an individual false alarm list in the collating device illustrated in FIG. 9.

FIG. 17 is a diagram schematically illustrating an outline of alarm determination processing employing an "individual false alarm list". In this figure, the similarity "65" between a face of the visitor A and the registered face in the collation list No. 1 is compared with the threshold value "50". Because the similarity "65" is equal to or higher than the threshold value "50", alarm activation is performed. At that time, if a false alarm notification is given from a user, the visitor A is added to the individual false alarm list corresponding to the collation list No. 1.

Next, the similarity "55" between the visitor B and the registered face in the collation list No. 1 is compared with the threshold value "50". In addition, the similarity "68" between the visitor B and the visitor A which corresponds to the individual false alarm list in the collation list No. 1 is compared with the threshold value "50". Although the similarity "55" between the visitor B and the registered face in the collation list No. 1 exceeds the threshold value "50", the similarity "68" between the visitor B and the visitor A which corresponds to the individual false alarm list in the collation list No. 1 is higher than the similarity "55". Thus, alarm activation isn't performed. Next, the similarity "50" between the face of the visitor C and the registered face in the collation list No. 2 is compared with the threshold value "50". Because the similarity "50" is equal to or higher than the threshold value "50", alarm activation is performed. Then, the visitor C is added to the individual false alarm list in the collation list No. 2.

Next, the similarity "60" between the face of the visitor D and the registered face in the collation list No. 1 is compared with the threshold value "50". In addition, the similarity "51" between the visitor D and the visitor A which corresponds to the individual false alarm list in the collation list No. 1 is compared with the threshold value "50". Because the similarity "60" between the face of the visitor D and the registered face in the collation list No. 1 is higher than the similarity "51" between the visitor D and the visitor A which corresponds to the individual false alarm list, alarm activation is performed. Then, the visitor D is added to the individual false alarm list in the collation list No. 1. A drawing illustrating the addition of the visitor A to the individual false alarm list in the collation list No. 1 is omitted. Thus, the number of times of activation of a false alarm can be reduced (to a total of three times of activation of a false alarm) by allowing each registered person in the collation list to have a false alarm list.

Figure 18:
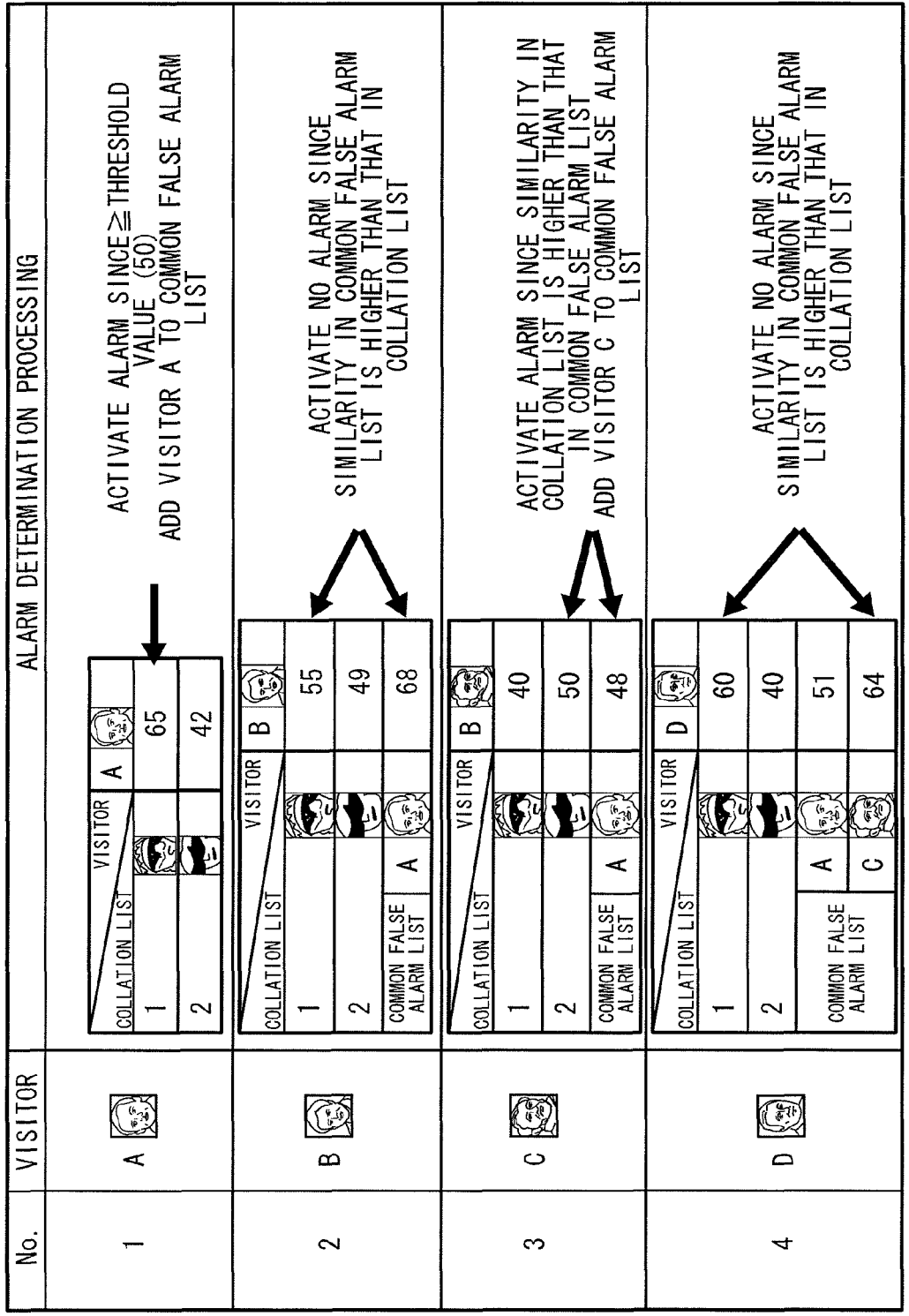
FIG. 18 is a diagram schematically illustrating an outline of alarm determination processing employing a common false alarm list in the collating device illustrated in FIG. 9.

FIG. 18 is a diagram schematically illustrating an outline of alarm determination processing employing a "common false alarm list". In this figure, the similarity "65" between a face of the visitor A and the registered face in the collation list No. 1 is compared with the threshold value "50". Because the similarity "65" is equal to or higher than the threshold value "50", alarm activation is performed. Then, the visitor A is added to the common false alarm list. Next, the similarity "55" between the face of the visitor B and the registered face in the collation list No. 1 is compared with the threshold value "50". In addition, the similarity "68" between the visitor B and the visitor A in the common false alarm list is compared with the threshold value "50". However, the similarity "68" between the visitor B and the visitor A in the common false alarm list is higher than the similarity "55" between the face of the visitor B and the registered face in the collation list No. 1. Thus, alarm activation isn't performed.

Next, the similarity "50" between the face of the visitor C and the registered face in the collation list No. 2 is compared with the threshold value "50". In addition, the similarity "48" between the visitor C and the visitor A in the common false alarm list is compared with the threshold value "50". The similarity "50" between the face of the visitor C and the registered face in the collation list No. 2 is higher than the threshold "50", alarm activation is performed. Then, the visitor C is added to the common false alarm list. Next, the similarity "60" between the face of the visitor D and the registered face in the collation list No. 1 is compared with the threshold value "50". In addition, the similarity "64" between the visitor D and the visitor C in the common false alarm list is compared with the threshold value "50". However, the similarity "64" between the visitor D and the visitor C in the common false alarm list is higher than the similarity "60" between the face of the visitor D and the registered face in the collation list No. 1, alarm activation isn't performed. Thus, many data can be collected from an initial stage by allowing the collation list to have a common false alarm list. Consequently, the number of false alarms can be reduced (to a total of two times of activation of a false alarm).

Thus, the collating device 5 according to Embodiment 2 is provided with the collation lists 61 having false alarm lists configured by the threshold value for the registered face image, and false alarm information, which correspond to the registered face image. At activation of a false alarm, the input face image is added to the false alarm list as false alarm information. If the false alarm information similarity obtained by collating the input face image with the false alarm information is larger than the similarity between the input face image and the registered face image, the threshold value is updated to equalize the threshold value to the similarity corresponding to the false alarm information. The occurrence of alarm failures and false alarms can be suppressed to a further lower level, as compared with the collating device 1 according to the above Embodiment 1.

Although each of the collation lists 61 according to the present embodiment has a false alarm list corresponding to each registered image, the collation lists 61 may have a common false alarm list common to the registered images.

Embodiment 3

Figure 20:
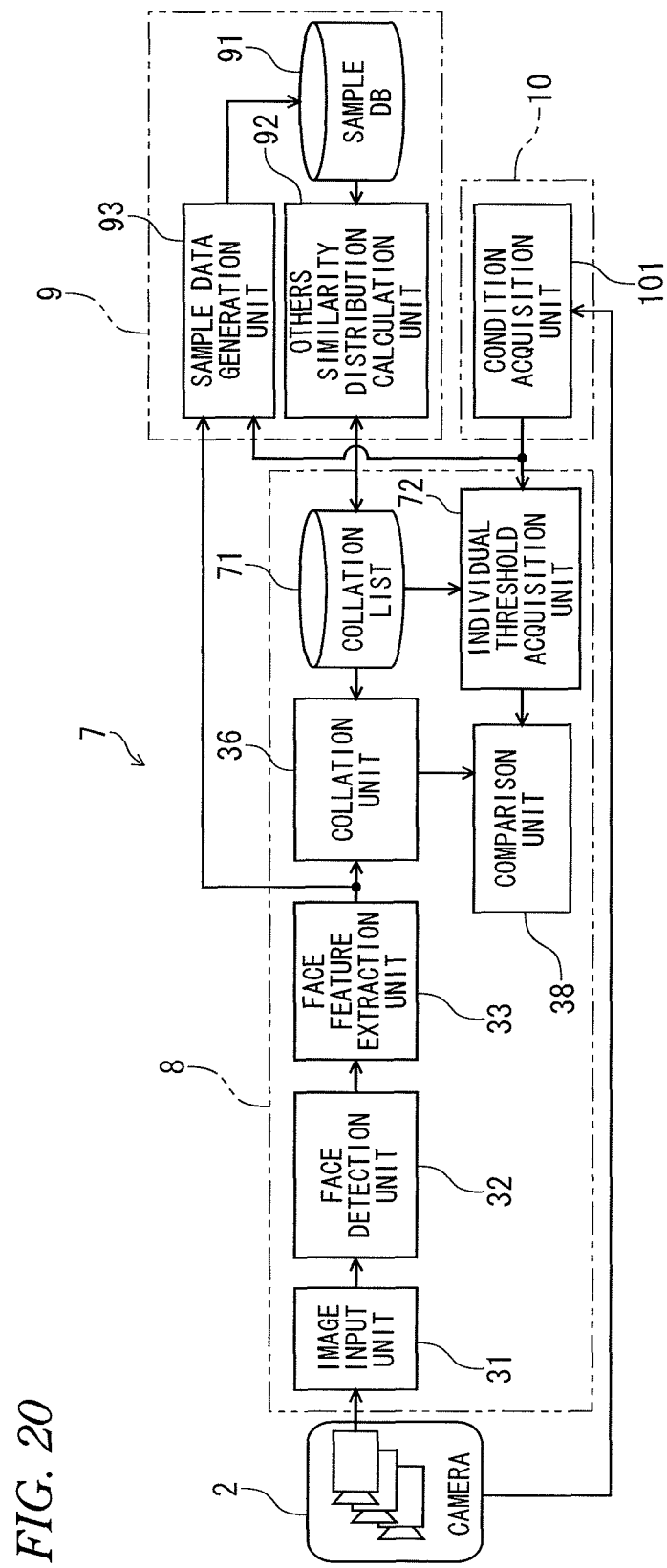
FIG. 20 is a block diagram illustrating a schematic configuration of a collating device according to Embodiment 3 of the invention.

FIG. 20 is a block diagram illustrating a schematic configuration of a collating device according to Embodiment 3 of the invention. Incidentally, in this figure, portions common to this collating device and the collating device 1 according to the above Embodiment 1 are designated with the same reference numeral.

In FIG. 20, a collating device 7 according to Embodiment 3 includes an image capture device 2, a face recognition device 8, a data generation device 9, and a condition acquisition device 10. The face recognition device 8 includes an image input unit 31, a face detection unit 32, a face feature extraction unit 33, collation lists 71, a collation unit 36, an individual threshold acquisition unit 72, and a comparison unit 38. The data generation device 9 includes a sample database (DB) 91, an others similarity distribution calculation unit 92, and a sample data generation unit 93. The condition acquisition device 10 includes a condition acquisition unit 101.

In the face recognition device 8, the collation lists 71 manage registered face images (thus, registered face feature amounts) and threshold values respectively associated with the registered face images. FIG. 21 is a diagram illustrating an example of the collation lists 71. In this figure, the collation list No. 1 manages, each registered face feature amount "(12, 34, . . . )" and a threshold value obtained according to conditions, corresponding to each registered face image. The conditions are grouped into sets "morning", "daytime" and "night". Thresholds according to weather are set in each of the sets. Similarly, the collation list No. 2 manages each registered face feature amount "(45, 12, . . . )" and a threshold value obtained according to conditions, corresponding to each registered face image. The conditions are grouped into sets "morning", "daytime" and "night". Thresholds according to weather are set in each of the sets.

Turning back to FIG. 20, the collation unit 36 obtains the similarity between the input face feature amount obtained by the face feature extraction unit 33 and the registered face feature amount managed by the collation list 71. The collation unit 36 outputs results to the comparison unit 38. The comparison unit 38 compares the similarity obtained by the collation unit 36 with the threshold value acquired from the individual threshold acquisition unit 72. If the obtained similarity exceeds the threshold value, alarm activation is performed. The individual threshold acquisition unit 72 acquires, from the collation list 71, threshold values according to the conditions acquired from the condition acquisition unit 101 of the condition acquisition device 10. The condition acquisition unit 101 includes sensors, such as a pressure sensor and a camera, in addition to a clock unit (not shown), and acquires present conditions (i.e., conditions, such as date and weather, in which an image of a subject is captured). Incidentally, weather is estimated with a camera, based on a luminance difference.

In the data generation device 9, the sample database 91 manages face image samples and conditions, such as weather and clock-time, at the time of capturing each face image sample by associating the face image samples with the conditions. Then, the others similarity distribution calculation unit 92 obtains the similarity between the face images registered in the collation lists 71 and the face image samples managed by the sample database 91. Then, the similarities obtained corresponding to each condition are tallied. In addition, thresholds are obtained from the similarities tallied corresponding to each condition. Thus, a threshold value corresponding to each condition is set corresponding to each face image managed by the collation lists 71. The sample data generation unit 93 collects face images and input face feature amounts from the face feature extraction unit 33 as face samples. In addition, the sample data generation unit 93 collects conditions, such as weather and clock-time, at the time of collecting face samples and classifies face samples corresponding to each condition to thereby create a database of sample data.

Figure 22:
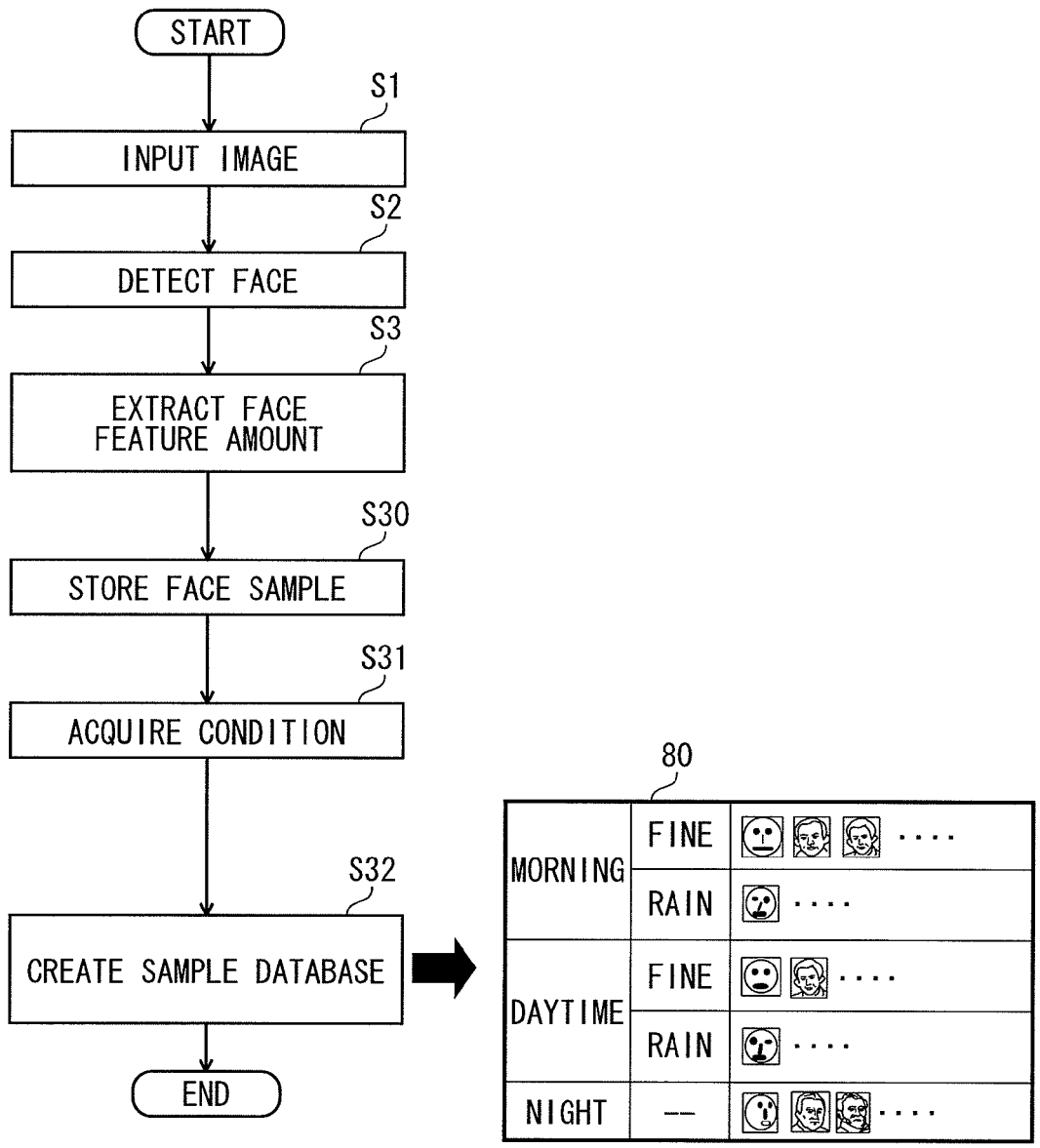
FIG. 22 is a flowchart for illustrating an outline of category-specific sample acquisition processing performed in the collating device illustrated in FIG. 20.

FIG. 22 is a flowchart for illustrating an outline of category-specific sample collection processing (i.e., sample database creation processing) in the collating device 7 according to Embodiment 3. In this figure, in step S1, first, the image input unit 31 receives a captured image from the image capture device 2. Then, in step S2, the face detection unit 32 detects the face of a person from the captured image and outputs face region information. The face detection unit 32 also outputs the captured image.

Next, in step S3, the face feature extraction unit 33 extracts a face feature from a face region in a captured image and obtains a feature amount of a face image, i.e., an input face feature amount, based on results. Then, in step S30, the sample data generation unit 93 of the data generation device 9 temporarily stores the face images and the input face feature amounts as face samples. Next, in step S31, the condition acquisition unit 101 of the condition acquisition device 10 acquires current conditions such as weather and clock-time. Then, in step S32, the sample data generation unit 93 classifies the face samples corresponding to each condition and generates sample data 80.

Figure 23:
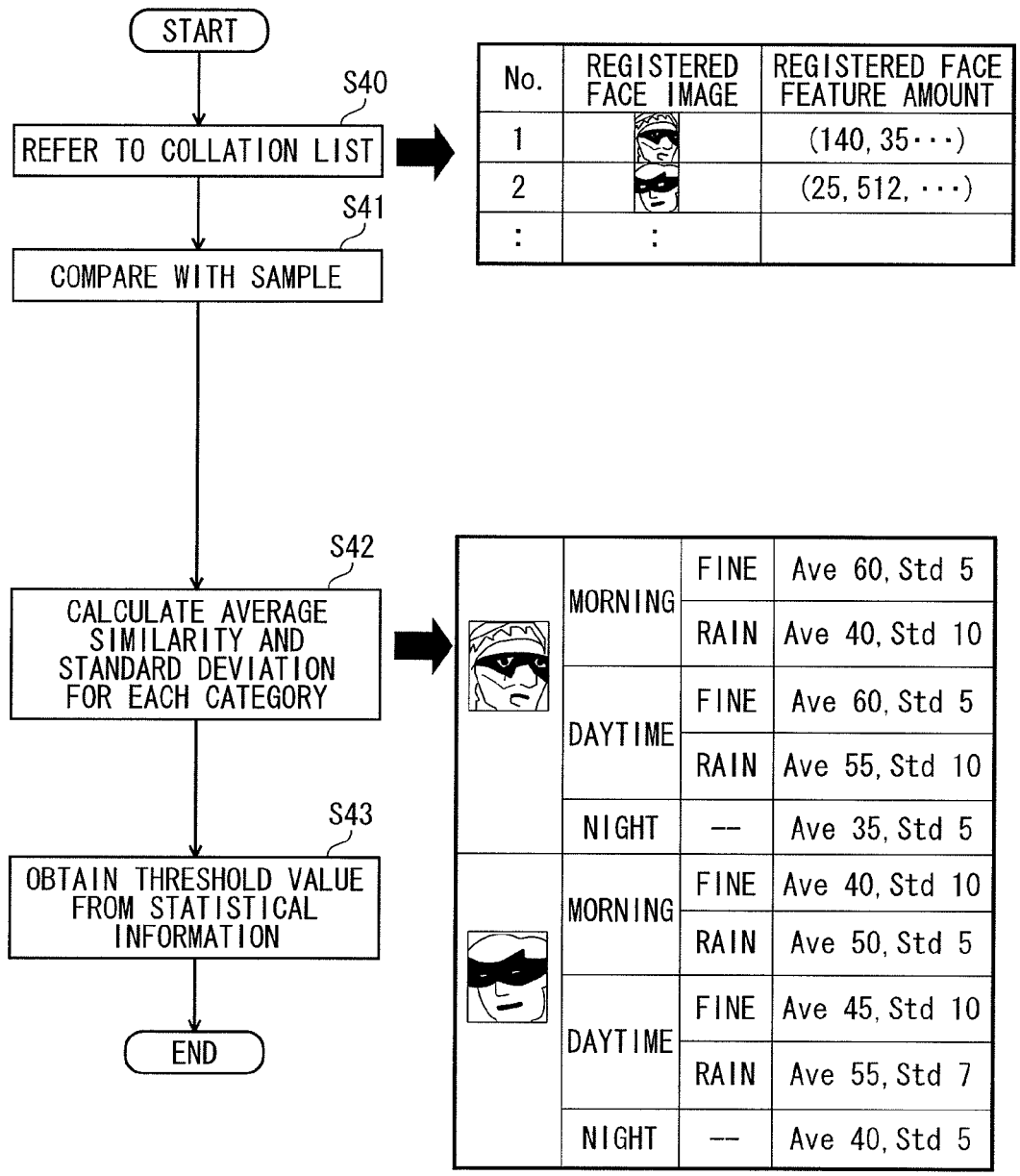
FIG. 23 is a flowchart for illustrating an outline of collation list update processing performed in the collating device illustrated in FIG. 20.

FIG. 23 is a flowchart illustrating an outline of collation list update processing performed in the collating device 7 according to Embodiment 3. This processing is performed by the others similarity distribution calculation unit 92 of the data generation device 9. In this figure, in step S40, first, the others similarity distribution calculation unit 92 refers to the collation lists 71 and acquires the feature amount of the registered face image. At an initial stage, no thresholds are set. Thus, the collation lists 71 contains only registered face images and registered face feature amounts, as illustrated in the right-side neighbor of step S40.

Then, in step S41, the others similarity distribution calculation unit 92 compares the registered face image with the face sample obtained by the above category-specific sample collection processing. That is, the others similarity distribution calculation unit 92 compares each registered face image in the collation lists 71 with the face sample obtained by the category-specific sample collection processing to obtain a similarity. In this case, the "others" may include an identical person having each registered face. However, statistically, this isn't problematic.

Then, in step S42, the others similarity distribution calculation unit 92 calculates, based on the comparison between each registered face image and each face sample, a category-specific average similarity and a standard deviation. That is, the others similarity distribution calculation unit 92 obtains such statistical information concerning results of the comparison between each registered face image and each face sample corresponding to each condition. In this case, the others similarity distribution calculation unit 92 obtains the average similarity (Ave) and the standard deviation (Std). Then, in step S43, the others similarity distribution calculation unit 92 obtains a threshold from the statistical information. In this case, the others similarity distribution calculation unit 92 obtains an individual threshold value (Thr) as follows. That is, Thr=Ave (i.e., the average similarity)+Std (i.e., the standard deviation). Finally, the collation lists 71 configured as illustrated in FIG. 21 are obtained.

Figure 24:
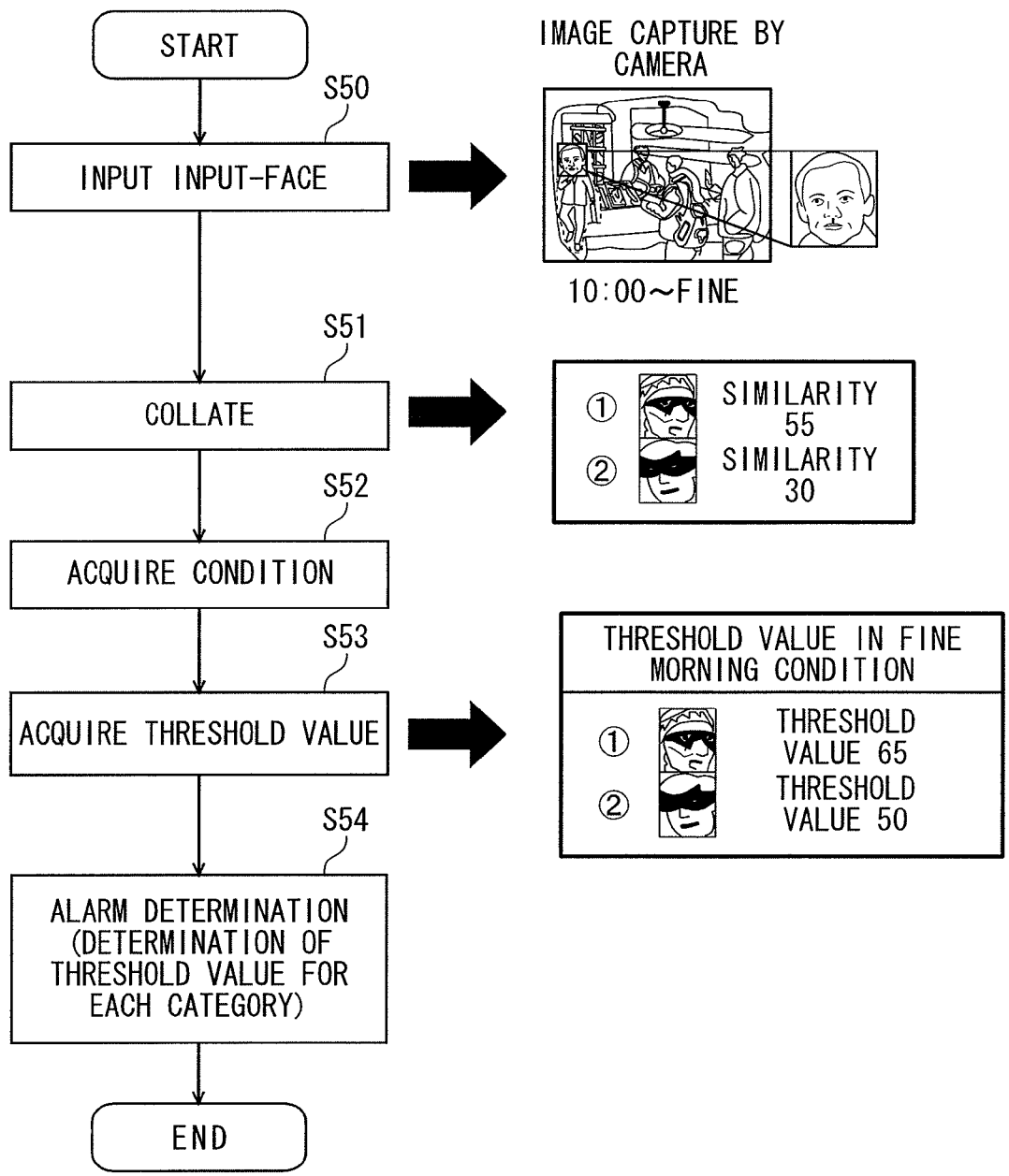
FIG. 24 is a flowchart for illustrating an outline of blacklist collation processing performed in the collating device illustrated in FIG. 20.

FIG. 24 is a flowchart for illustrating an outline of blacklist collation processing performed in the collating device 7 according to Embodiment 3. In this figure, in step S50, the image input unit 31 receives a captured image from an image capture device 2. The face detection unit 32 detects a face of a person from the captured image. The face feature extraction unit 33 extracts a face feature from a face region in the captured image and obtains an input face feature amount. Then, in step S51, the collation unit 36 collates the input face feature amount with the registered face feature amount in the collation lists 71 and obtains a similarity. Here, it is assumed that the similarity between the input face feature amount and the registered feature amount in the collation list No. 1 is "55", and the similarity "30" between the input face feature amount and the registered face feature amount in the collation list No. 2, as illustrated in the right-side neighbor of step S51.

Next, in step S52, the condition acquisition unit 101 of the condition acquisition device 10 acquires current conditions, e.g., "AM 10:00" and "fine". After the current conditions are acquired, in step S53, the individual threshold acquisition unit 72 acquires a threshold value according to the current conditions. Here, it is assumed that a threshold value in the conditions "morning" and "fine" is "65" in the collation list No. 1, and such a threshold value is "50" in the collation list No. 2, as illustrated in the right-side neighbor of step S53. Although the foregoing description has been described using clock-time and weather as examples of the conditions, any other conditions may be used as long as capturing of an image of a person is affected. For example, interior illuminance may be used.

Next, in step S54, the comparison unit 38 compares the threshold value acquired by the individual threshold acquisition unit 72 with the similarity output from the collation unit 36 and performs alarm determination. Incidentally, a threshold value is determined corresponding to each category. For example, in a case where the similarity "55" between the input face feature amount and the registered face feature amount in the collation list No. 1 is "55", where the similarity "55" between the input face feature amount and the registered face feature amount in the collation list No. 2 is "30", where the threshold value in the collation list No. 1 is "65", and where the threshold value in the collation list No. 2 is "50", no similarities exceed the threshold values. Thus, alarm activation isn't performed.

Incidentally, according to the present embodiment, a sample image is not necessarily used when a threshold value corresponding to each condition is performed. The others similarity distribution calculation unit 92 may estimate a current state from a result of collation of the registered face image with the image of the face of the latest visitor and obtain a threshold value satisfying the condition.

Figure 25:
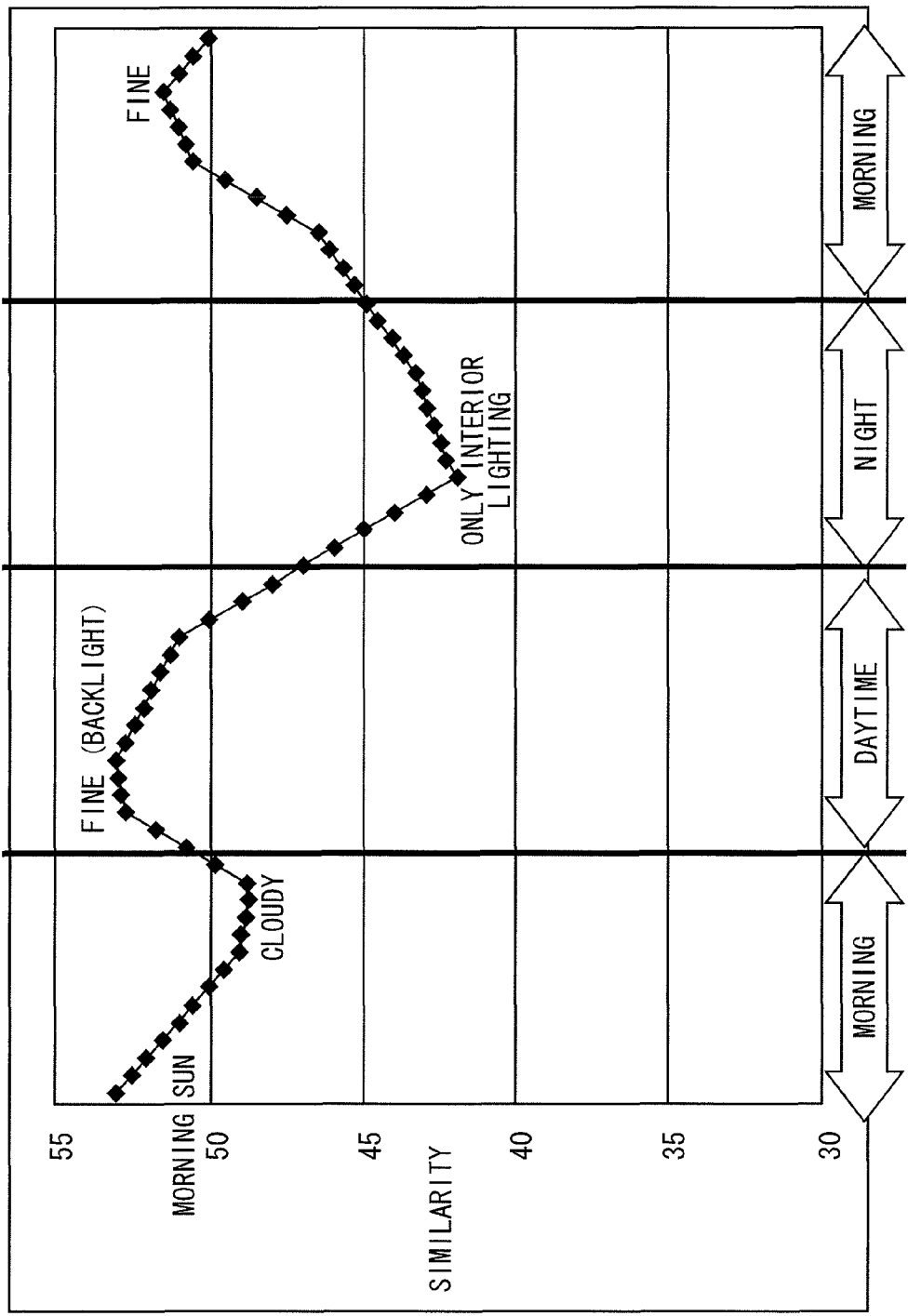
FIG. 25 is a diagram illustrating an example of a time-specific similarity between a registered face image and a captured face image of a visitor.
Figure 26:
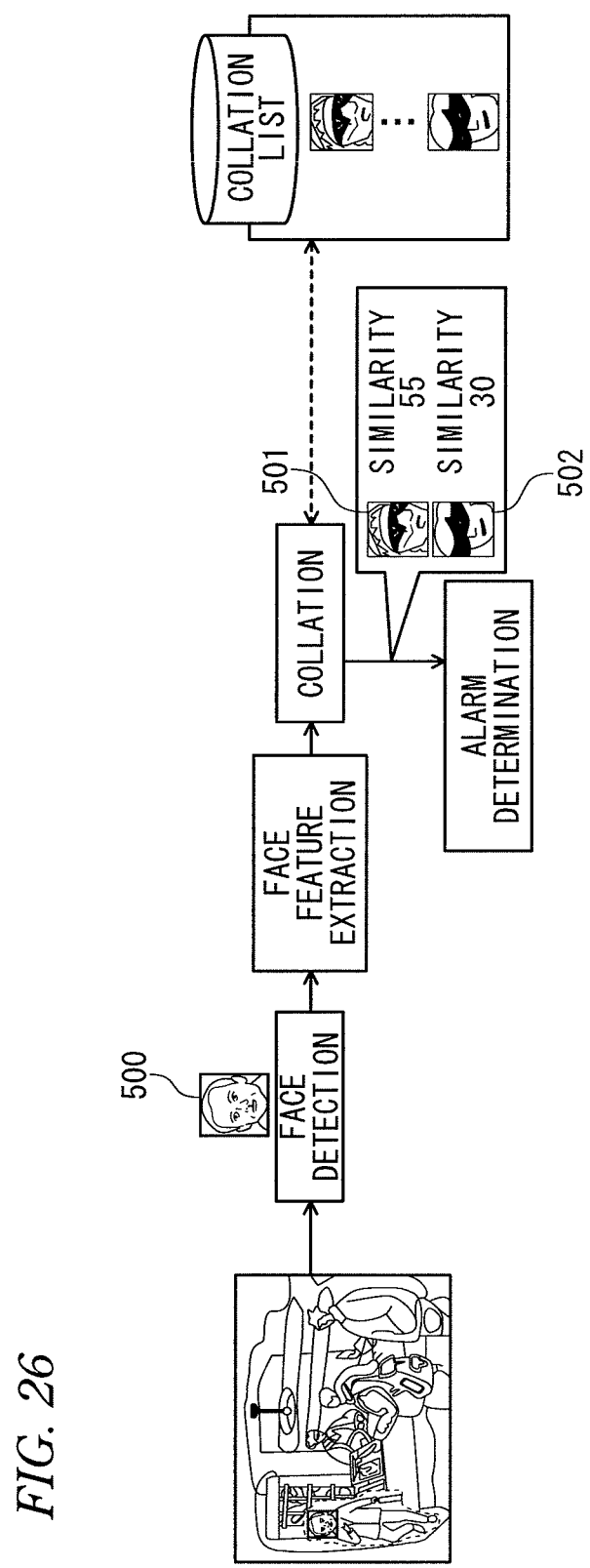
FIG. 26 is a diagram schematically illustrating a configuration of a conventional collating device.
Figure 27A:
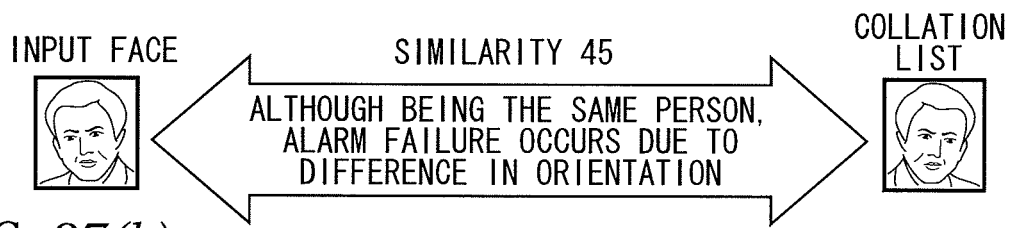
FIGS. 27(a) and 27(b) are diagrams for illustrating problems in the conventional collating device.
Figure 27B:
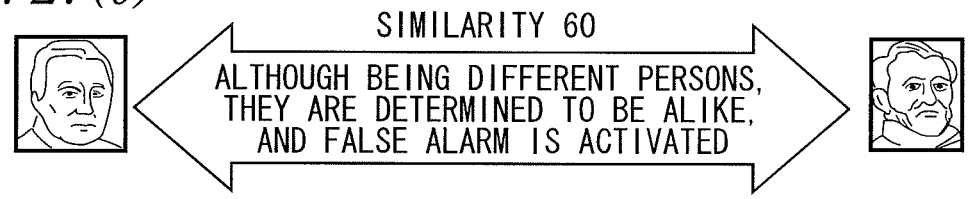

FIG. 25 is a diagram illustrating an example of a time-specific similarity between a registered face image and a captured face image of a visitor. This graph is obtained by calculating the average of the similarity between the registered face image and the face image of a visitor at regular time intervals. The registered face image is an example of an image in the case of a nearly backlit face (i.e., a face captured in a condition in which the difference between rear luminance and front luminance is very large). It is found from this graph that if the condition for capturing an image of a visitor is fine-weather (backlight), the similarity between the registered face of the face of the visitor is high, and that if the condition for capturing a visitor is that only interior illumination is used, the similarity between the registered face of the face of the visitor is low. Thus, the condition for capturing a visitor can be estimated using the latest similarity.

The others similarity distribution calculation unit 92 retains data representing the average (Ave) and the standard deviation (Std) of the similarity of a registered face image to the image of the face of each of the latest N visitors (e.g., N=100). In addition, the others similarity distribution calculation unit 92 obtains thresholds using the following expression. That is, Thr=Ave+A×Std (incidentally, "A" is a constant). In a case where the standard deviation (i.e., the degree of variation from the average) Std is large (i.e., in a time period in which an illumination condition varies), a default threshold value or the constant A may be set at a value according to a gradient ratio of a curve of the graph (e.g., during a time period in which the curve rises, A=3.0, and during a time period in which the curve falls, A=0.1). The gradient ratio for determining the constant A may be obtained from points of the curve in the graph, which represent data of the latest N visitors.

The threshold value obtained from the latest similarity reflects the condition at the time of obtaining the threshold value. Thus, a condition acquisition means is unnecessary. Consequently, it is advisable that the collation list retains a threshold value corresponding to each registered face image, instead of threshold values corresponding to each condition, and that the others similarity distribution calculation unit 92 periodically updates a threshold value in the collation list, using the obtained threshold value. Accordingly, a threshold value obtained in consideration of the condition can be used with a simple configuration.

Thus, the collating device 7 according to Embodiment 3 includes the condition acquisition unit 101 configured to acquire conditions at the time of capturing an image, which include date and weather. The others similarity distribution calculation unit 92 classifies, according to conditions at the time of acquiring a registered face image, threshold values serving as a criterion for determining whether alarm activation is performed. In addition, the others similarity distribution calculation unit 92 determines a threshold value according to the condition obtained by the condition acquisition unit 101. Thus, as compared with the above collating device 1 according to Embodiment 1, occurrence of an alarm failure and a false alarm can be suppressed to a further lower level.

Incidentally, the collating devices 1, 5, and 7 according to the above Embodiments 1, 2, and 3 are configured to handle images of faces of persons. However, objects to be handled by the collating device according to the invention are not limited to faces of persons. The collating device according to the invention may handle an image of the entire person. Alternatively, the collating device according to the invention may handle subjects other than persons. Accordingly, the input face images may be handled as input images. The registered face images may be handled as registered images.

The invention has been described in detail with reference to the particular embodiments. However, it is obvious to those skilled in the art that various alterations and modifications can be applied thereto without departing from a spirit and a scope of the invention.

This application is based upon Japanese Patent Application (Japanese Patent Application No. 2010-096009) filed on Apr. 19, 2010, the entire contents of which are incorporated herein by reference.

INDUSTRIAL APPLICABILITY

The invention has an advantage in being capable of suppressing occurrence of an alarm failure or a false alarm to a low level and can be applied to camera systems for the management of security-operations and for the management of important visiting customers.

DESCRIPTION OF REFERENCE SIGNS 1, 5, 7: Collating Device
2: Image Capture Device
3, 6, 8: Face Recognition Device
4: Display Terminal
9: Data Generation Device
10: Condition Acquisition Device
31: Image Input Unit
32: Face Detection Unit
33: Face Feature Extraction Unit
34, 61, 71: Collation List
35, 62: Collation List Update Unit
36, 63: Collation Unit
37, 72: Individual Threshold Acquisition Unit
38, 65: Comparison Unit
41: Input Receiving Unit
42: Display Unit
64: Individual Threshold Calculation Unit
91: Sample Database
92: Others Similarity Distribution Calculation Unit
93: Sample Data Generation Unit
101: Condition Acquisition Unit
411: User Interface
611: Individual False Alarm List
612: Common False Alarm List
4113: "DON'T MISS" button
4114: "ANNOYING" button

The invention claimed is:

1. A collating device comprising:
a collation list configured to retain a false alarm list comprising a registered image, a threshold value serving as a criterion for determining whether to perform alarm activation, and a false alarm person image of a person who is not to be alarmed and who was previously erroneously alarmed due to having been mistaken for another person who is to be alarmed;
a collator configured to collate an input image with the registered image and the false alarm person image managed by the collation list, such that the collator obtains a similarity between the input image with the one of the registered image and the false alarm person image; and
a comparator configured to compare:
a larger one of a value of the obtained similarity between the input image and the false alarm person image, and the threshold value; and
the similarity between the input image and the obtained registered image, such that the comparator determines whether to perform the alarm activation.

2. The collating device according to claim 1, wherein the collation list comprises the false alarm list for each registered image.

3. The collating device according to claim 1, wherein the collation list comprises the false alarm list common to the registered images.

4. The collating device according to claim 2, wherein the collation list adds the input image to the false alarm list as false alarm information if the alarm activation is activation of a false alarm.

5. A collating device comprising:
a collation list configured to retain a registered image feature amount, a threshold value serving as a criterion for determining whether to perform alarm activation, and a false alarm person image feature amount of a person who is not to be alarmed and who was previously erroneously alarmed due to having been mistaken for another person who is to be alarmed;
a collator configured to collate an input image with the registered image feature amount and the false alarm person image feature amount retained by the collation list, such that the collator obtains a similarity between the input image with the one of the registered image feature amount and the false alarm person image feature amount; and
a comparator configured to compare:
a larger one of a value of the obtained similarity between the input image and the false alarm person image feature amount, and the threshold value; and
the similarity between the input image and the obtained registered image feature amount, such that the comparator determines whether to perform the alarm activation.

6. A collation method comprising:
providing a collation list retaining a false alarm list comprising a registered image, a threshold value serving as a criterion for determining whether to perform alarm activation, and a false alarm person image of a person who is not to be alarmed and who was previously erroneously alarmed due to having been mistaken for another person who is to be alarmed;
collating an input image with at least one of the registered image and the false alarm person image managed by the collation list, and obtaining a similarity therebetween; and
comparing:
a larger one of a value of the obtained similarity between the input image and the false alarm person image and the threshold value; and
the obtained similarity between the input image and the registered image; and
determining, based on said comparing, whether to perform the alarm activation.

* * * * *